US010659553B2

(12) United States Patent
Ito et al.

(10) Patent No.: US 10,659,553 B2
(45) Date of Patent: *May 19, 2020

(54) MEMORY SYSTEM ALLOWING HOST TO EASILY TRANSMIT AND RECEIVE DATA

(71) Applicant: TOSHIBA MEMORY CORPORATION, Minato-ku (JP)

(72) Inventors: Kuniaki Ito, Funabashi (JP); Yasufumi Tsumagari, Kawasaki (JP); Takashi Wakutsu, Kamakura (JP); Shuichi Sakurai, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 277 days.

This patent is subject to a terminal disclaimer.

(21) Appl. No.: 15/621,586

(22) Filed: Jun. 13, 2017

(65) Prior Publication Data

US 2017/0279917 A1 Sep. 28, 2017

Related U.S. Application Data

(60) Continuation of application No. 14/885,778, filed on Oct. 16, 2015, now Pat. No. 9,712,636, which is a
(Continued)

(30) Foreign Application Priority Data

Feb. 16, 2011 (JP) .................................. 2011-030849

(51) Int. Cl.
*H04L 29/08* (2006.01)
*G06K 19/077* (2006.01)
(Continued)

(52) U.S. Cl.
CPC .......... *H04L 67/2842* (2013.01); *G06F 3/061* (2013.01); *G06F 3/067* (2013.01);
(Continued)

(58) Field of Classification Search
CPC ...... H04L 67/02; H04L 67/2842; H04W 4/60; H04N 21/2743; H04N 21/4184;
(Continued)

(56) References Cited

U.S. PATENT DOCUMENTS 6,643,803 B1 * 11/2003 Swoboda ............ G06F 11/3656
714/29
7,475,420 B1 * 1/2009 Hernacki ............ H04L 63/0281
726/12
(Continued)

FOREIGN PATENT DOCUMENTS

CN 1464453 A 12/2003
CN 101895572 A 11/2010
(Continued)

OTHER PUBLICATIONS

"Physical Layer Simplified Specification", SD Specifications, Technical Committee SD Card Association, Part 1, Version 3.01, May 18, 2010, pp. 1-141.
(Continued)

*Primary Examiner* — Azizul Choudhury
(74) *Attorney, Agent, or Firm* — Oblon, McClelland, Maier & Neustadt, L.L.P.

(57) ABSTRACT

According to one embodiment, a memory system includes a non-volatile semiconductor memory device, a control unit, a memory as a work area, a wireless communication module, and an extension register. The control unit controls the non-volatile semiconductor memory device. The extension register is provided in the memory and has a data length by which a wireless communication function of the wireless communication module can be defined. The control unit causes the non-volatile semiconductor memory device to store, as a file, an HTTP request supplied from a host, causes the extension register, based on a first command supplied from the host, to register an HTTP transmission command
(Continued)

transmitted together with the first command, and causes the wireless communication module to transmit the HTTP request stored in the non-volatile semiconductor memory device based on the transmission command registered in the extension register.

10 Claims, 20 Drawing Sheets

Related U.S. Application Data division of application No. 13/234,211, filed on Sep. 16, 2011, now abandoned.

(51) Int. Cl.
| | |
|---|---|
| *H04N 5/765* | (2006.01) |
| *H04N 21/4223* | (2011.01) |
| *H04N 21/2743* | (2011.01) |
| *H04N 21/418* | (2011.01) |
| *H04N 21/4363* | (2011.01) |
| *H04N 21/61* | (2011.01) |
| *H04N 21/643* | (2011.01) |
| *H04W 4/60* | (2018.01) |
| *G06F 3/06* | (2006.01) |

(52) U.S. Cl.
CPC .......... *G06F 3/0643* (2013.01); *G06F 3/0658* (2013.01); *G06F 3/0679* (2013.01); *G06K 19/07732* (2013.01); *H04L 67/02* (2013.01); *H04N 5/765* (2013.01); *H04N 21/2743* (2013.01); *H04N 21/4184* (2013.01); *H04N 21/4223* (2013.01); *H04N 21/43637* (2013.01); *H04N 21/6181* (2013.01); *H04N 21/64322* (2013.01); *H04W 4/60* (2018.02)

(58) Field of Classification Search
CPC ......... H04N 21/4223; H04N 21/43637; H04N 21/6181; H04N 21/64322; G06F 3/061; G06F 3/0643; G06F 3/0658; G06F 3/067; G06F 3/0679; G06K 19/07732
See application file for complete search history.

(56) References Cited

U.S. PATENT DOCUMENTS

| | | |
|---|---|---|
| 7,580,996 B1 | 8/2009 | Allan et al. |
| 7,769,867 B2 | 8/2010 | Fukuda |
| 2002/0174337 A1 | 11/2002 | Aihara |
| 2006/0161749 A1 | 7/2006 | Chen et al. |
| 2007/0061581 A1 | 3/2007 | Holtzman et al. |
| 2007/0094504 A1* | 4/2007 | Takinosawa .......... G06F 13/385 713/172 |
| 2008/0294276 A1 | 11/2008 | Nakayama |
| 2009/0270117 A1 | 10/2009 | Buckley |
| 2009/0281874 A1* | 11/2009 | Leblanc .............. H04L 67/2823 709/207 |
| 2010/0057960 A1* | 3/2010 | Renno ................. G06F 12/1433 710/110 |

FOREIGN PATENT DOCUMENTS

| | | |
|---|---|---|
| JP | 7-282210 A | 10/1995 |
| JP | 2001-356885 A | 12/2001 |
| JP | 2002-329180 | 11/2002 |
| JP | 2003-514302 A | 4/2003 |
| JP | 2006-507608 A | 3/2006 |
| JP | 2009-124302 | 6/2009 |
| TW | 200920093 A | 5/2009 |

OTHER PUBLICATIONS

"SDIO Simplified Specification", SD Specifications, Technical Committee SD Card Association, Part E1, Version 3.00, Feb. 25, 2011, pp. 1-79.
Office Action dated Jul. 2, 2013 in Japanese Patent Application No. 2011-030849 with English language translation.
Combined Taiwanese Office Action and Search Report dated Feb. 19, 2014 in Patent Application No. 100132483 (with English language translation of the Office Action).
Office Action dated Mar. 13, 2014 in Chinese Patent Application No. 201110275466.9 (with English translation).
Office Action dated Sep. 30, 2014 in the corresponding Chinese Patent Application No. 201110275466.9 (with English Translation).

\* cited by examiner

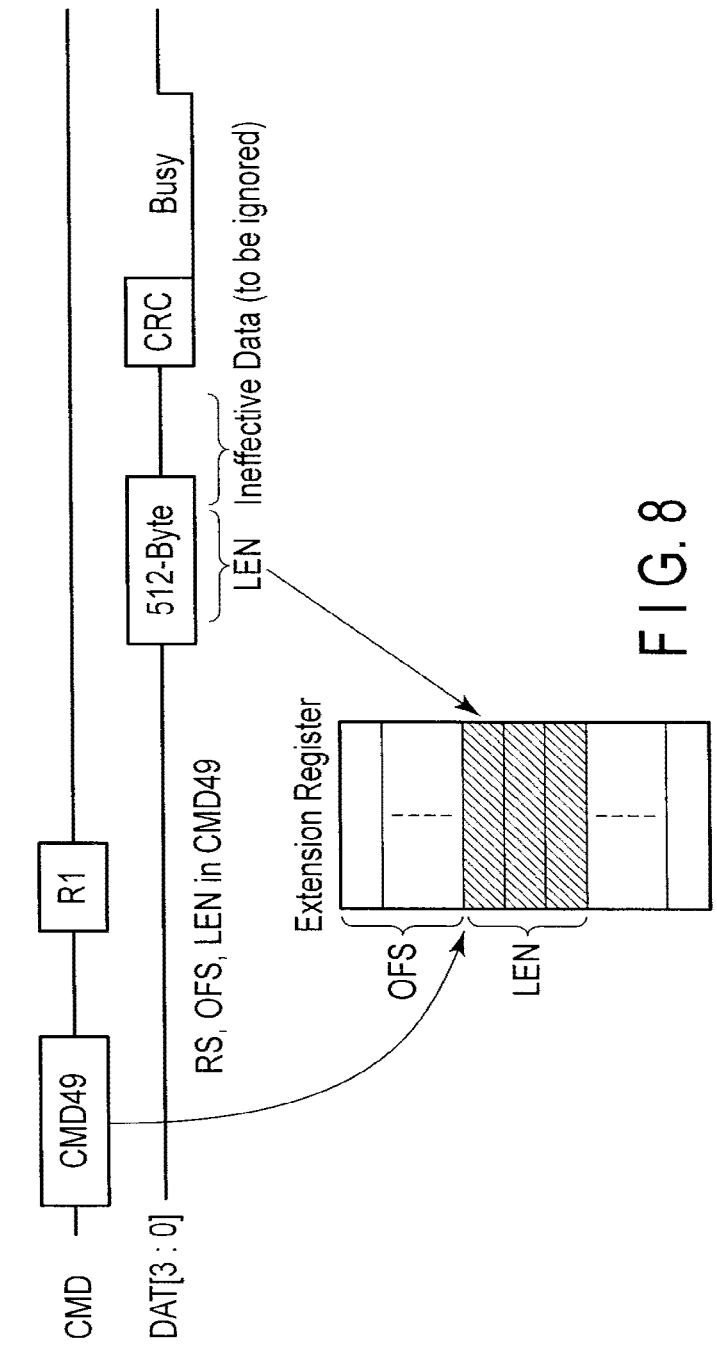

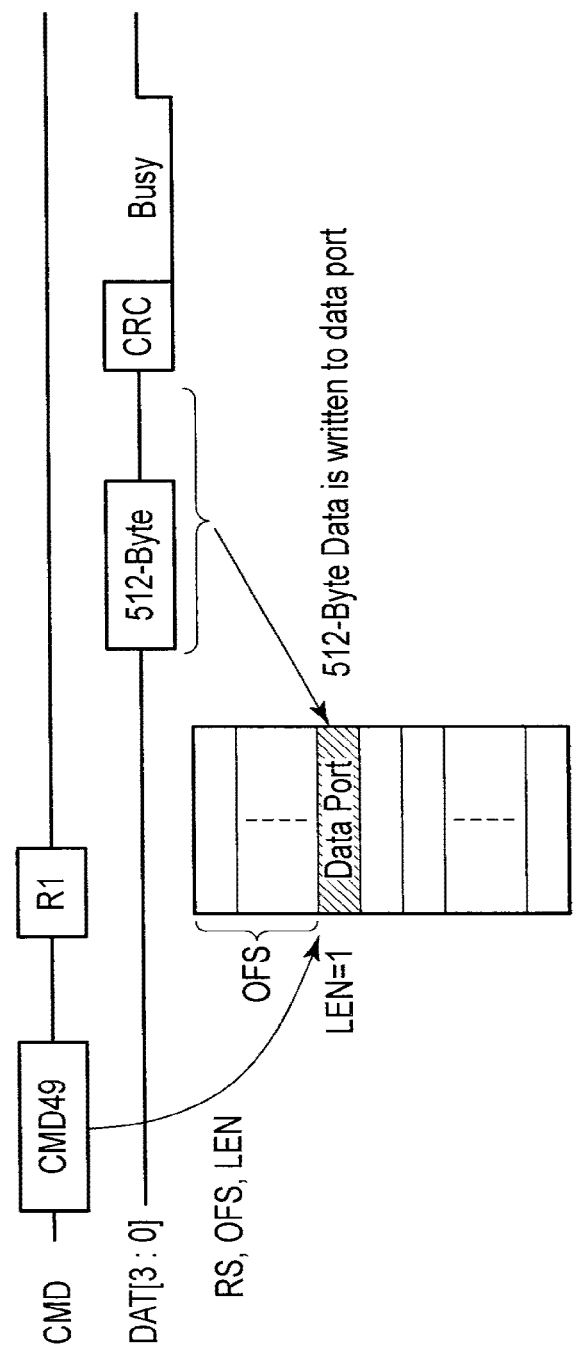
F I G. 9

| | | |
|---|---|---|
| Structure revision | 2 bytes | Revision defining format of page 0 |
| Length of data | 2 bytes | Length of valid data recorded in page 0 |
| Number (=N) of extension functions | 1 byte | Number of extension functions supported by device |
| Preliminary | 1 byte | (Adjusted such that field contains an even number of bytes) |
| Function identification code of device 1 | 4 bytes | Standardized device driver is used in extension function of standard device identification code. 0 is set in non-standard function. |
| Manufacturer identification information of device 1 | 16 bytes | Manufacturer or distributor name is recorded as character string |
| Function identification information of device 1 | 16 bytes | Extension function provides information to check whether dedicated driver is installed. Model, revision, etc. are represented as character string. |
| First address (Page 0) of subsequent device | 2 bytes | Proceed to check device 2 when device 1 is not used. |
| Addresses and lengths (=X) of device 1 | 2 bytes | Number of addresses and length fields set below |
| Start address 1 and length 1 of device 1 | 2 bytes each | First area of extension register used by device 1. Indicate first address in extension register of pages 1-7 and size of extension register being used. |
| Start address 2 and length 2 of device 1 | 2 bytes each | Second area of extension register used by device 1 |
| ... | | |
| Start address X and length X of device 1 | 2 bytes each | Xth area of extension register used by device 1 |
| Function identification code of device 2 | 4 bytes | Information area of device 2. Content is same as that of device 1. |
| Start address Y of device 2 | 4 bytes | Indicates end of address/length information of device 2 |
| ... | | |
| Function identification code of device N | 4 bytes | Information area of device N. Content is same as that of device 1. |
| Start address Z and length Z of device N | 4 bytes | Indicates end of address/length information of device N |
| Unused area | | |

F I G. 10

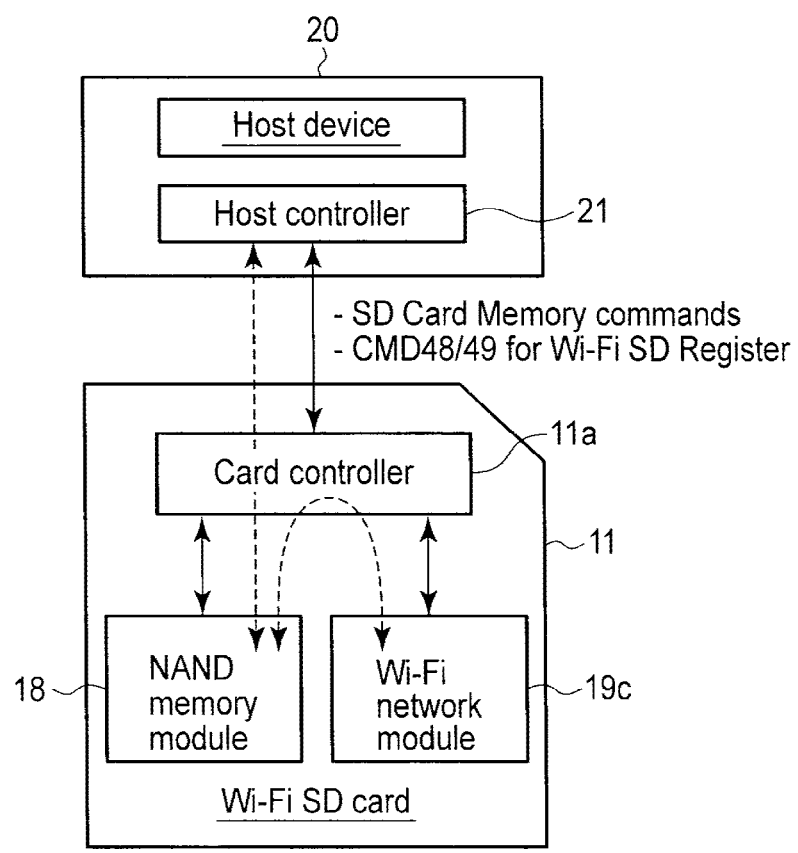
F I G. 1 5

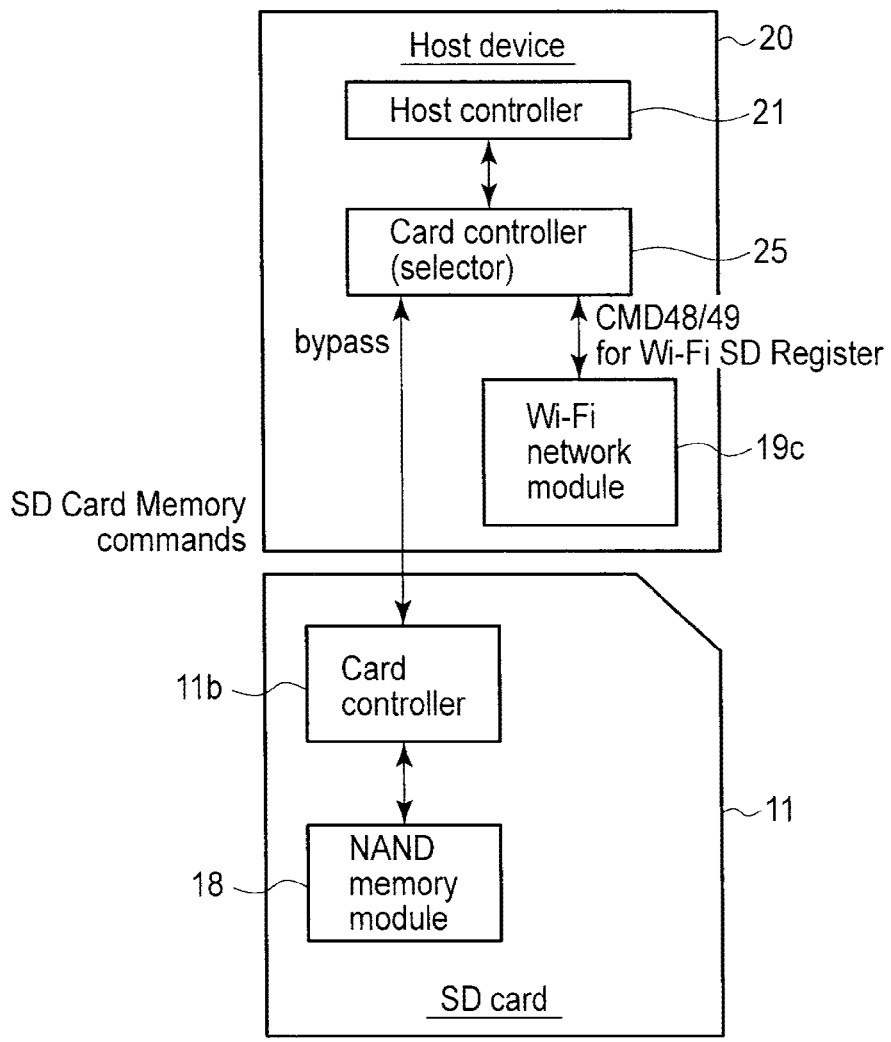
F I G. 16
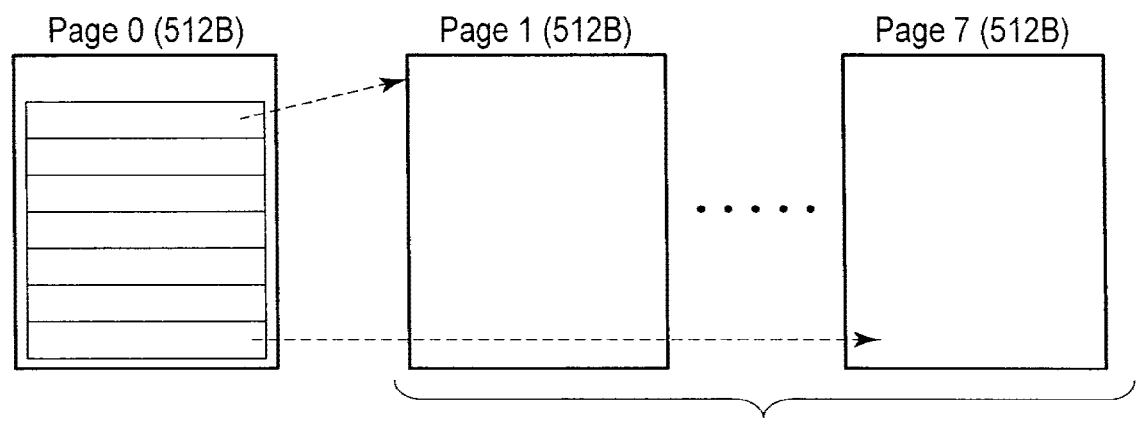
F I G. 17

MEMORY SYSTEM ALLOWING HOST TO EASILY TRANSMIT AND RECEIVE DATA

CROSS-REFERENCE TO RELATED APPLICATIONS

This application is a continuation of U.S. application Ser. No. 14/885,778 filed Oct. 16, 2015, which is a divisional of U.S. application Ser. No. 13/234,211, filed Sep. 16, 2011, and is based upon and claims the benefit of priority from prior Japanese Patent Application No. 2011-030849, filed Feb. 16, 2011, the entire contents of each of which are incorporated herein by reference.

FIELD

Embodiments described herein relate generally to a memory system equipped with a wireless communication function.

BACKGROUND

SD cards equipped with a wireless communication function or a wireless LAN function have been developed. In an SD card equipped with a wireless LAN function, the host cannot communicate with networks freely, and communications are performed independently using the wireless communication function of the SD card. Further, an SDIO card equipped only with a wireless communication function is not provided with a TCP stack, a group of programs compiled from a plurality of programs relating to the TCO/IP communications protocols, which are necessary for generating an application that performs communications via a wireless LAN. This demands the host to follow a complex procedure.

BRIEF DESCRIPTION OF THE DRAWINGS

FIGS. 7A, 7B and 7C illustrate an operation of a mask register.

FIG. 8 is a timing diagram illustrating a write operation to the extension register using a write command.

FIG. 9 is a timing diagram illustrating a write operation to a data port using a write command.

FIG. 10 illustrates an example of an information field set on the first page of the extension register.

FIG. 15 illustrates a block diagram of a Wi-Fi SD card and a host device.

FIG. 16 illustrates another block diagram of the SD card and the host device.

FIG. 17 illustrates an example of the extension register accessed by a read command (CMD48) and a write command (CMD49).

DETAILED DESCRIPTION

Figure 1:
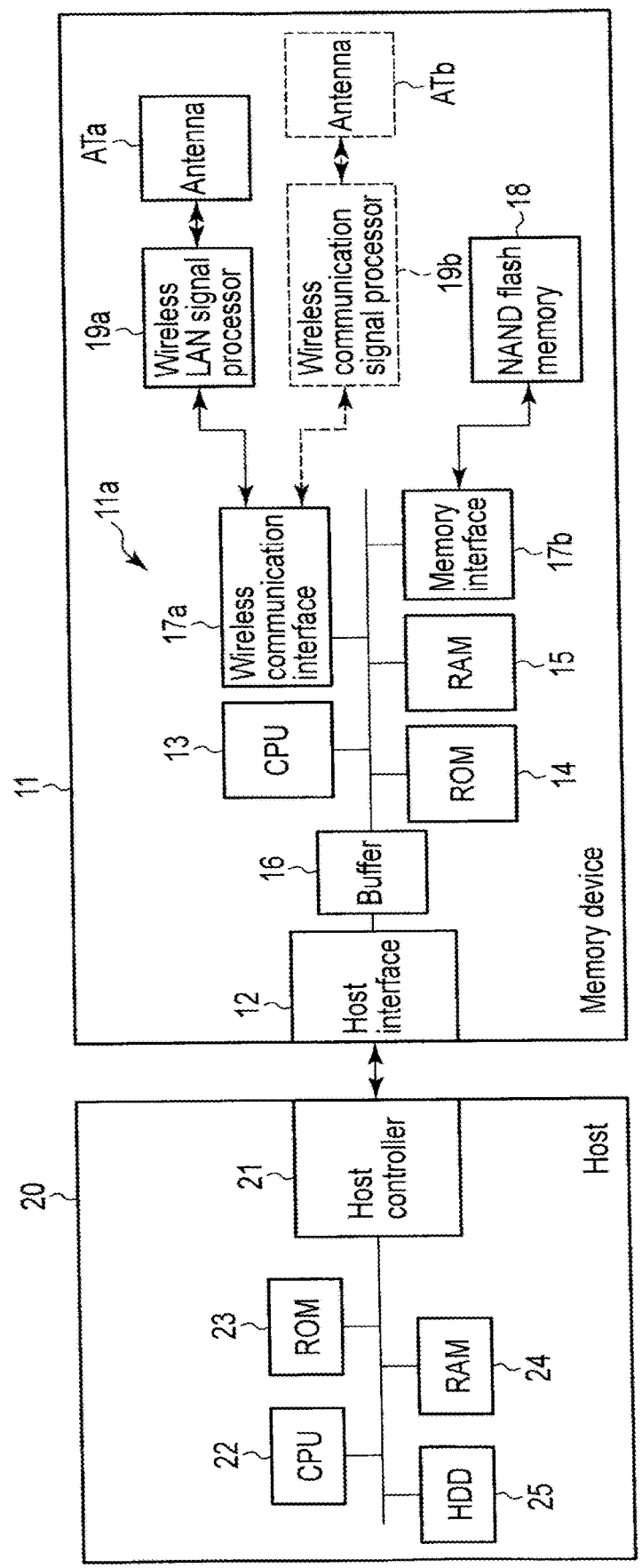
FIG. 1 is a block diagram schematically illustrating a memory system applied to the present embodiment.

In general, according to one embodiment, a memory system includes a non-volatile semiconductor memory device, a control unit, a memory, a wireless communication module, and an extension register. The control unit controls the non-volatile semiconductor memory device. The memory as a work area is connected to the control unit. The wireless communication module is controlled by the control unit. The extension register is provided in the memory and has a certain data length by which the wireless communication function of the wireless communication module can be defined. The control unit causes the non-volatile semiconductor memory device to store a Hypertext Transfer Protocol (HTTP) request supplied from the host as a file, causes the extension register to register a HTTP transmission command transmitted together with the first command based on the first command supplied from the host, and causes the wireless communication module to transmit an HTTP request stored in the non-volatile semiconductor memory device based on the transmission command registered in the extension register.

Recently, wireless data communications have become available among a variety of electronic devices (among portable digital devices, in particular). Such electronic devices include personal computers, mobile information terminals known as personal digital assistants (PDA), mobile phones, mobile audio devices, and digital cameras.

If wireless data communications can be handled between such electronic devices, the need for cable connection is eliminated, and hence the usefulness is enhanced. In particular, with the spread of the wireless local area network (LAN) system, the wireless LAN system has also been employed in SD cards for use in a digital camera as a memory, as well as in personal computers or built-in devices.

In order to implement the above-described function in an SD card, the SD memory card needs to be provided with structural elements such as an interface designed to be physically connected to a host, an antenna, a high-frequency processor (processor configured to transmit and receive radio signals), and a baseband processor (processor configured to handle baseband signals), as well as a flash memory.

The procedure for controlling a wireless LAN function in such an SD card equipped with a wireless LAN function depends on what SD card manufacturers implement, and is not uniquely defined. Another problem is how to implement the control procedure.

Further, an SD card equipped with a communication function may also be equipped with a communication function using a system other than the wireless LAN system. In that case, the host is not able to use the functions of the SD card without a means for knowing what functions are provided in the SD card.

In view of the above, the present embodiment presents a means for ascertaining an extension function other than the original memory function in an SD card, which is widely used as a memory for use in digital cameras, for example. Moreover, the present embodiment presents a procedure for controlling functions other than the original memory function. In particular, the present embodiment enables control of wireless LANs, for example, in a command system of an SD memory. Thereby, the present embodiment provides an SD card equipped with a wireless function having a high affinity with a host digital device, such as a digital camera.

Conventionally, SD cards equipped with a wireless communication function and a wireless LAN function have been developed. Such a card only needs to be equipped with a dedicated wireless communication function and configured to control only the additional dedicated function. Since there exists a wide variety of wireless communication functions, however, setting definitions so as to control the entire wireless communication function would make the address space of the command insufficient.

It is thereby possible in the present embodiment to provide an extension register formed of a plurality of pages in an SD card, and configured to perform read/write operations on the extension register using commands CMD48, CMD49, which are included in command specifications of the SD memory. The CMD48 is a command designed to read data from a target register on a block-by-block basis, and the CMD49 is a command designed to write data to a target register on a block-by-block basis. The extension register includes a page indicating functions provided in the SD card, a page designed to control a communication function provided in the SD card, and a page used to exchange data to be communicated, for example.

Moreover, by using the extension register, the host can easily perform Hypertext Transfer Protocol (HTTP) communications.

Embodiment

Hereinafter, an embodiment will be described with reference to the accompanying drawings.

FIG. 1 schematically shows a memory system according to the present embodiment.

The memory system comprises a memory device 11, such as an SD card, and a host 20. The memory device 11 will also be referred to as SD card. Further, the host 20 will also be referred to as host device.

The memory device 11 operates upon receipt of a power supply from the host 20 when the memory device 11 is connected thereto, and performs a process in response to an access from the host 20. The memory device 11 includes a card controller 11a.

The card controller 11a includes a host interface 12, a CPU 13, a read-only memory (ROM) 14, a random access memory (RAM) 15, a buffer 16, a wireless interface 17a, and a memory interface 17b, for example, which are connected via a bus. A NAND flash memory 18, for example, is connected to the memory interface 17b. A wireless LAN signal processor 19a as an extension function portion is connected to the wireless communication interface 17a. An antenna ATa, configured to transmit and receive high-frequency signals, is connected to the wireless LAN signal processor 19a.

The extension function portion may form a multi-function SD card by further providing a wireless communication signal processor 19b for signals other than wireless LAN signals, and an antenna ATb connected to the wireless communication signal processor 19b, as well as the wireless LAN signal processor 19a. For example, the wireless LAN signal processor 19a controls a wireless communication function using Wi-Fi (registered trademark), for example, and the wireless communication signal processor 19b controls a proximity wireless communication function using TransferJet (registered trademark), for example.

The host interface 12 performs interface processing between the card controller 11a and the host 20.

On the other hand, the wireless communication interface 17a performs interface processing between the wireless LAN signal processor 19a and the wireless communication signal processor 19b. The memory interface 17b performs interface processing between the card controller 11a and the NAND flash memory 18.

The CPU 13 manages the operation of the entire memory device 11. A program for controlling the CPU 13 is executed by using firmware (control program, for example) stored in the ROM 14 or by being loaded in the RAM 15, and thereby a predetermined process is performed. That is, the CPU 13 generates a variety of tables and an extension register, which will be described later, on the RAM 18, accesses an area in the NAND flash memory 18 in response to a write command, a read command, or an erase command from the host 20, and controls a data transfer process via the buffer 16.

The ROM 14 stores firmware, such as a control program, used by the CPU 13. The RAM 15 is used as a work area of the CPU 13, and stores a control program, a variety of tables, and an extension register, which will be described later.

The buffer 16 temporarily stores a certain amount of data (of 1 page, for example) when the buffer 16 writes data transmitted from the host 20 to the NAND flash memory 18, for example, and temporarily stores a certain amount of data when the buffer 16 transmits data read from the NAND flash memory 18 to the host 20. With the intervention of the buffer 16, it is possible to control the SD bus interface and the back end in asynchronous mode.

The NAND flash memory 18 is formed of a memory cell having a stacked gate structure, or a memory cell having a MONOS structure, for example.

The wireless LAN signal processor 19 processes wireless LAN signals. Control is performed via the wireless communication interface 17a.

A digital camera, a portable phone, or a personal computer may be applied to the host 20. The host 20 includes a host controller 21, a CPU 22, a ROM 23, a RAM 24, and a hard disc 25 (including an SSD), for example, which are connected via a bus.

The CPU 22 controls the entire host. The ROM 23 stores firmware necessary for the operation of the CPU 22. While the RAM 24 is used as a work area of the CPU 22, for example, programs that can be executed by the CPU 22 are also loaded therein and executed. The hard disc 25 holds a variety of data. The host controller 21 performs interface processing with the memory device 11 in a state where the memory device 11 is connected. Further, the host controller 21 issues a variety of commands, which will be described later, according to an instruction from the CPU 22.

(Configuration of Firmware)

Figure 2:
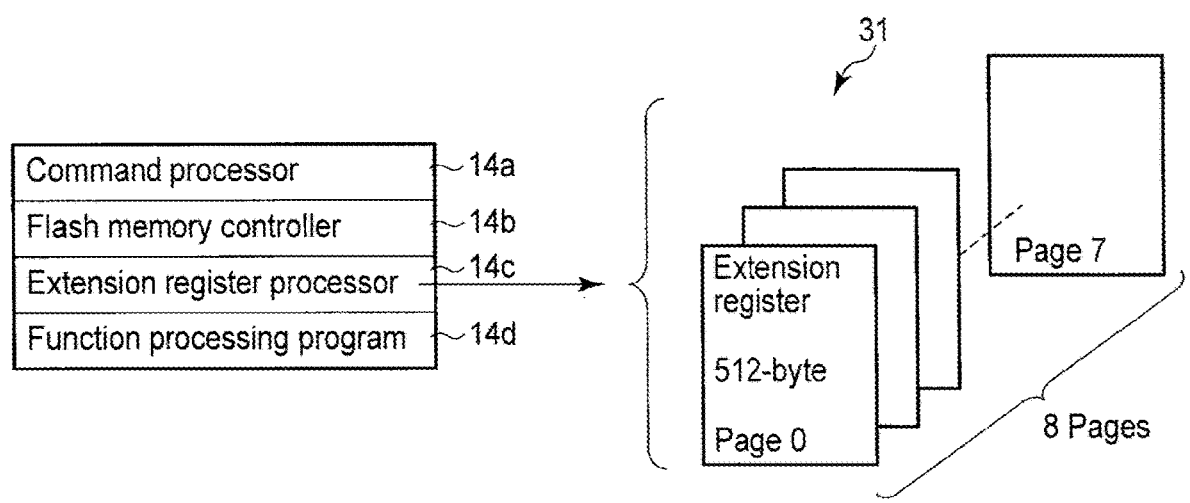
FIG. 2 is a block diagram illustrating firmware of the memory system shown in FIG. 1.

FIG. 2 shows an example of a functional configuration of firmware stored in the ROM 14 of the memory device 11. These functions are implemented by combination with hardware, such as the CPU 13, forming the controller 11a. The firmware includes a command processor 14a, a flash memory controller 14b, an extension register processor 14c, and a function processing program 14d, for example. The extension register processor 14c generates an extension register 31 in the RAM 15 when the memory device 11 is activated. The extension register 31 is a virtual register configured to be able to define an extension function.

(Configuration of Extension Register)

As shown in FIG. 2, the extension register 31 includes 8 pages, for example, each of which is 512 bytes long. An address of at least 9 bits will be required in order to access a 512-byte extension register on a byte-by-byte basis, and an address of at least 3 bits will be required in order to access 8 pages. An address of 12 bits in total allows access to the entire space of the extension register.

The reason for setting 512 bytes as a unit is because a large number of memory card host controllers are configured to perform read/write transfer per 1 block=512 bytes. A host controller compatible with the wireless LAN system is able to read and write data on a byte-by-byte basis, which, however, is not supported by all the host controllers. In order for a large majority of host controllers to control the extension function, access should desirably be made per 512 bytes.

Of the 8 pages (pages 0 to 7), page 0 is an area used to record an information field so as to perform the extension function in a plug-and-play manner. In pages 1 to 7, information on the extension function is recorded. More specifically, information used to control the communication function is recorded in page 1, and information used to exchange data to be communicated is recorded in page 2. The host 20 is able to ascertain which pages correspond to the page used to control the communication function provided in the memory device 11 and the page used to exchange data to be communicated, based on information written to page 0, which indicates functions provided in the memory device 11. Details about the information field will be described later.

Read and write operations on the extension register are performed using dedicated read and write commands, which will be defined below. These commands include a first operation mode of performing read/write operations on the extension register, and a second operation mode in which a data port is formed.

(Read Command (CMD48) of Extension Register)

Figure 3:
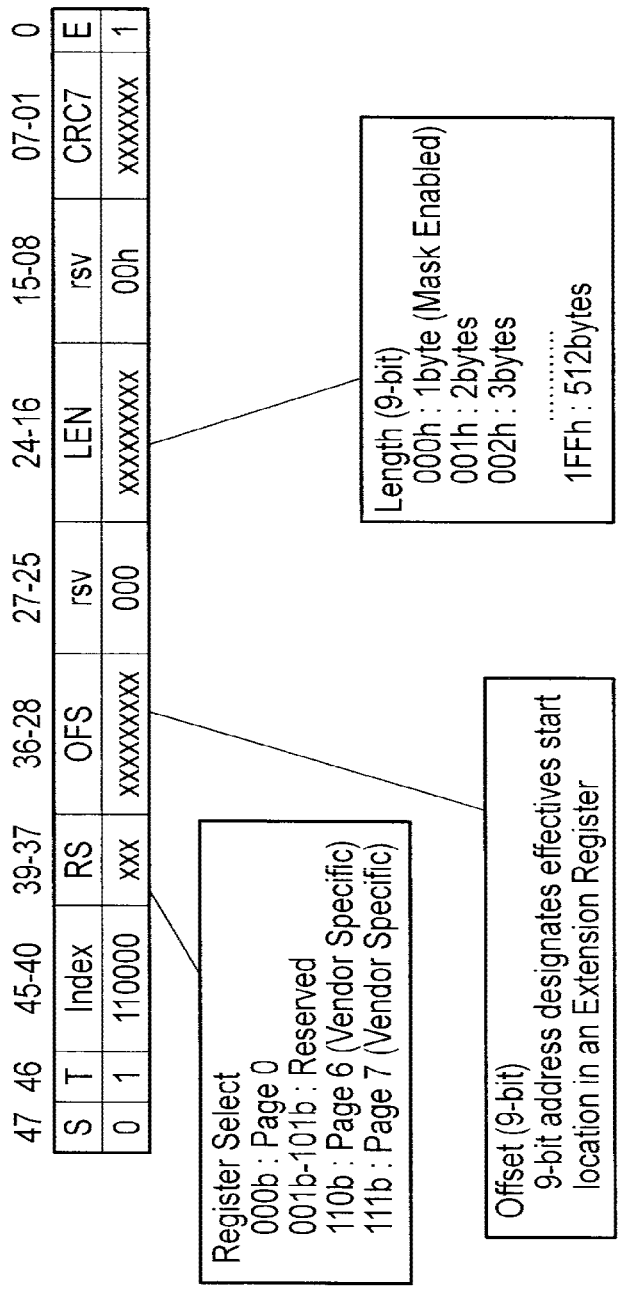
FIG. 3 is a block diagram illustrating an example of a read command of an extension register.

FIG. 3 shows an example of a field configuration of a read command (CMD48) on the extension register. The letter "S" denotes a start bit, the letter "T" denotes a bit indicating a transfer direction, and "Index" denotes a command number. The notation "RS" (standing for register select) denotes a page of the extension register 31, and the notation "OFS" denotes the location (offset from the head of the page) of data on the selected page. Space equivalent to the 8 pages of the 512-byte extension register can be specified on a byte-by-byte basis using the three-bit "RS" and the 9-bit "OFS". More specifically, a read start position in the selected extension register is specified by "RS" and "OFS".

The notation "LEN" denotes a length of data. A valid length of data necessary to read data from the 512-byte extension register is specified by the 9-bit LEN field.

The notation "CRC7" denotes a cyclic redundancy check code, and the letter "E" denotes an end bit of the command. The notation "rsv" denotes a preliminary bit.

(Read Command on Extension Register; First Operation Mode)

Figure 4:
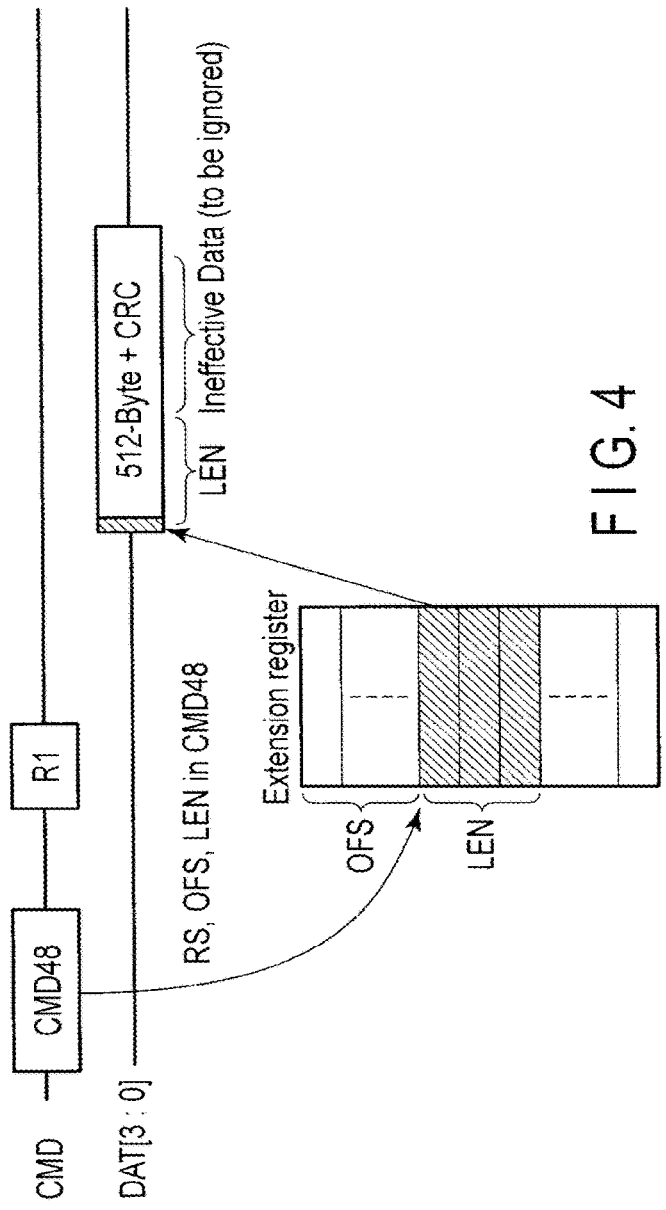
FIG. 4 is a timing diagram illustrating a read operation on the extension register using a read command.

FIG. 4 shows an example of a read operation on the extension register in a first operation mode.

As shown in FIG. 4, in response to a command (CMD48) from the host 20, the memory device 11 returns a response (R1) to the host 20, and then reads a 512-byte data block from the extension register 31.

More specifically, the page of the extension register and the location of data to be read in the page are specified by arguments "RS" and "OFS" of the command (CMD48), and the length of data is specified by "LEN". Data in the extension register specified in this way is set at the beginning of the 512-byte data block and read. Of the 512-byte data block, data of a length exceeding a length specified by "LEN" becomes invalid. A CRC code is added at the end of the data block, thereby making it possible to check whether data has been received properly (Invalid data will also be checked). Since valid data is placed from the beginning, the host 20 does not need to perform a data shift operation, for example, in order to find valid data.

(Read Command on Extension Register; Second Operation Mode)

Figure 5:
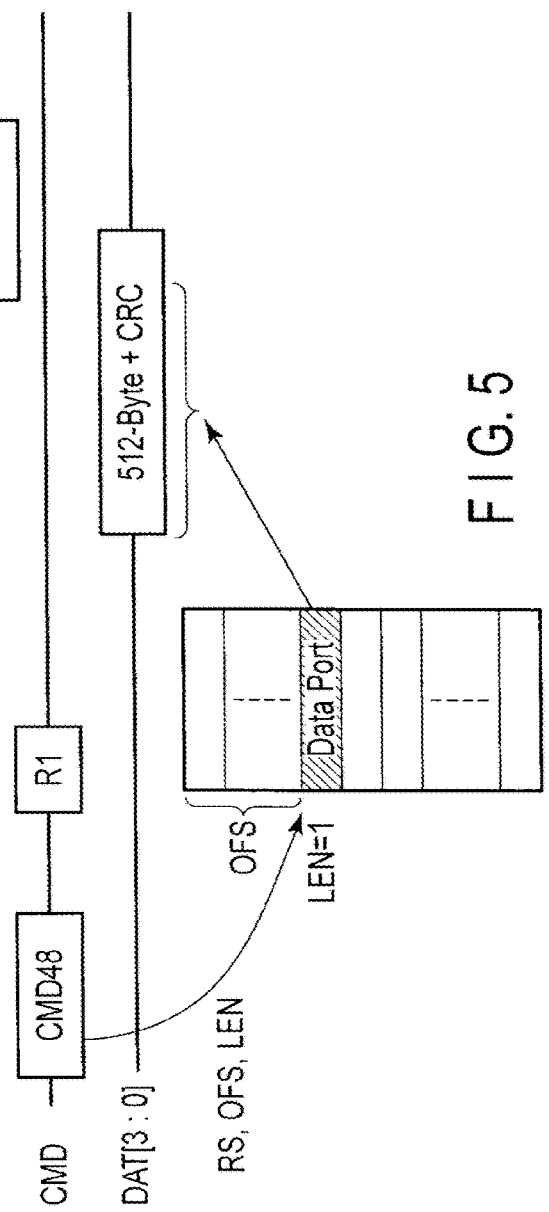
FIG. 5 is a timing diagram illustrating a read operation on a data port using a read command.

FIG. 5 shows an example of a read operation on a data port in a second operation mode.

In response to a command (CMD48), the memory device 11 returns a response (R1), and then returns a 512-byte data block.

The location on the selected page of the extension register is specified by the arguments "RS" and "OFS" of the command. Although a plurality of bytes can be allocated to a data port, 1 byte is enough, and hence FIG. 5 shows an example of a data port in which "LEN=0" (i.e., the length is 1). That is, the data port needs to occupy only a 1-byte address on the extension register map. One block (of 512 bytes) of data can be read from a device assigned to the data port. That is, data of one block (of 512 bytes) can be read each time. The read data is held in the buffer 16 and read by the host 20, for example.

When a read operation is performed on the same data port subsequently, the subsequent 512-byte data can be read. It is possible to freely define from where to obtain data to be read from the data port by the specification of the extension function. The data port can be controlled by defining a control register on the extension register, for example. A CRC code is added to the end of the 512-byte data block, making it possible to check whether the data has been received properly.

(Write Command (CMD49) of Extension Register)

Figure 6:
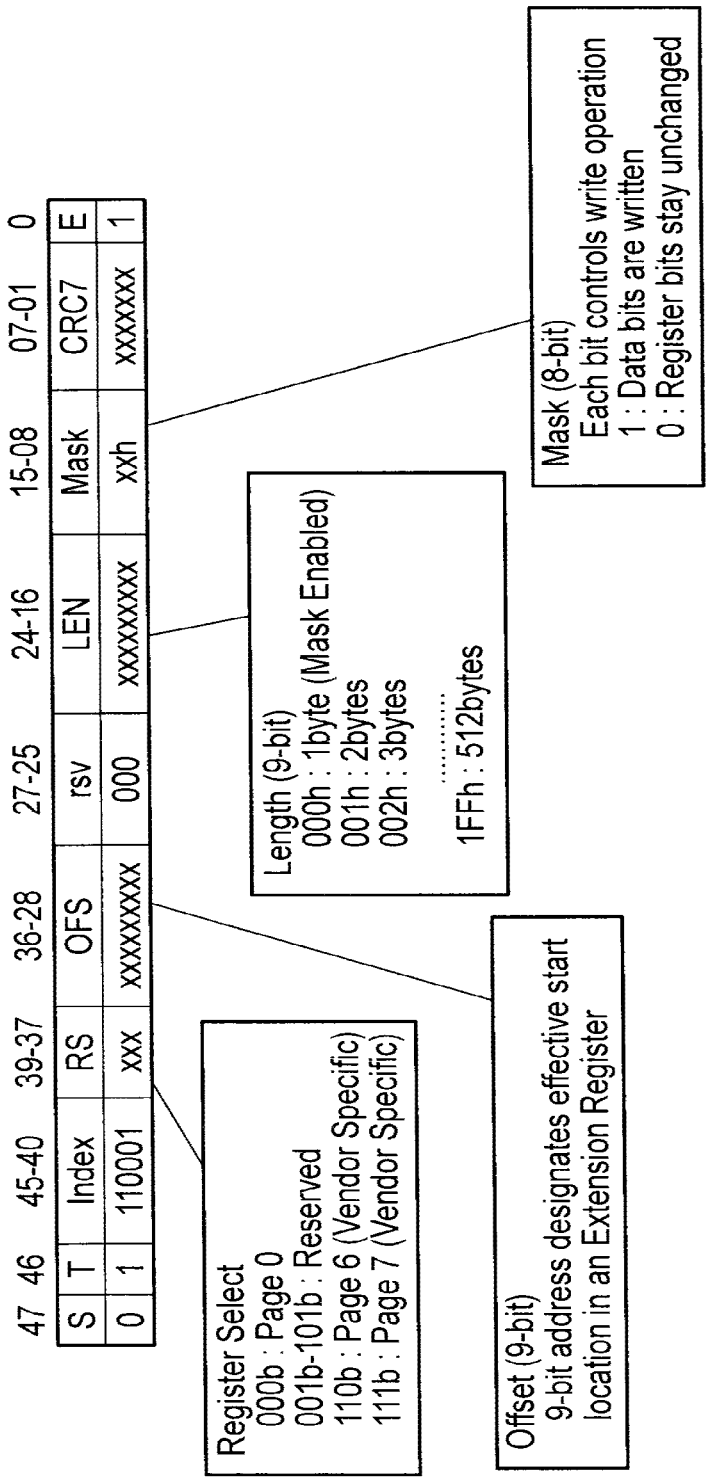
FIG. 6 is a block diagram illustrating an example of a write command of the extension register.

FIG. 6 shows an example of a write command to the extension register. In the write command (CMD49), the structural elements same as those of the read command (CMD48) are referred to by the same reference numerals. The write command and the read command are distinguished by "Index". The page of the extension register and the location of data on the selected page are specified by 3-bit "RS" and 9-bit "OFS". The length of data to be written to the 512-byte extension register is specified by a 9-bit "LEN" field. Thereby, data of an arbitrary length (in bytes) of the 512 bytes can be written to an arbitrary location in an arbitrary page of the extension register.

In the write command (CMD49), a mask register is provided in an argument of the command. That is, the notation "Mask" denotes a mask register of 8 bits long. This mask register enables a bit-by-bit operation when 1-byte data is written, thereby enabling data to be written only to a specific bit. This eliminates the need to perform a read-modify-write operation in a bitwise operation on data less than 1 byte. The mask register becomes valid when the length of data is 1 byte, or "LEN=0" (length 1). Data is written to a bit representing data "1" in the mask register "Mask", and a preset value is stored in a bit representing data "0" in the mask register "Mask".

More specifically, assuming that an extension register contains data as shown in FIG. 7A and data on a mask register is as shown in FIG. 7B, when a write command is executed, data is written to the bits representing data "1" in the mask register, and the original data is retained in the bits representing data "0", as shown in FIG. 7C. This makes it possible to replace data only in necessary bits, without the need to perform a read-modify-write operation. The portions denoted by "x" indicate bits to which new data has been written.

If mask data of a greater length can be supplied by another means, mask writing can be performed even when LEN>1. Since mask data is assigned to a command argument in the example of FIG. 6, however, the length of data is set as 8 bits.

(Write Command of Extension Register; First Operation Mode)

FIG. 8 shows an example of a write operation to the extension register in the first operation mode.

In response to a command (CMD49), the memory device 11 returns a response (R1) and then receives a 512-byte data block.

The memory device 11 returns a CRC code to the host 20, indicating whether the data block has been received properly. After that, the memory device 11 returns a busy signal until the command processing ends, letting the host 20 know about the timing when the next command can be issued. The data block is retained in the buffer 16.

In the command processing, the page of the extension register and the location therein are specified by command arguments "RS" and "OFS", and the length of data is specified by "LEN". Of the data block held in the buffer 16, data of a length specified by "LEN" from the beginning is written to the extension register. Data of a length exceeding the length specified by "LEN" in the data block is abandoned as invalid data.

By placing valid data from the beginning of the data block, the host system does not need to perform an operation of placing valid data at a midpoint of the data block.

(Write Command to Extension Register; Second Operation Mode)

FIG. 9 shows an example of a write operation to a data port in the second operation mode.

The memory device 11 returns a response (R1) in response to a command (CMD49), and then receives a 512-byte data block.

The memory device 11 returns a CRC code to the host indicating whether the data block has been received properly. After that, the memory device 11 returns a busy signal until the command processing ends, letting the host 20 know about the timing when the next command can be issued. The data block is held in the buffer 16.

In the command procedure, the page of the extension register and the location therein are specified by command arguments "RS" and "OFS". Although a plurality of bytes can be allocated to a data port, 1 byte is enough, and hence FIG. 9 shows an example in which a data port is used. The data port needs to occupy only a 1-byte address on the extension register map. One block (of 512 bytes) of data held in the buffer 16 can be written to a device assigned to the data port. That is, 1 block of data can be written each time.

By performing a write operation to the same data port subsequently, the subsequent 512-byte data can be written to the assigned device. It is possible to freely define to where to pass the data of the data port by the specification of the extension function. The data port can be controlled by defining a control register on the extension register, for example.

(Usage Example of Information Field in page 0)

FIG. 10 shows an example of an information field in page 0 of the extension register 31. By allowing the host 20 to specify the driver configured to control the extension function using the information field, when an extension function is added, the host system can easily use the extension function in a plug-and-play manner.

Referring to FIG. 10, a sequence example to be processed by a standard host driver will be described.

(Structure Revision)

The structure revision is a revision defining the format of page 0 of the extension register 31. When new information is added to the device information field, an update of the structure revision indicates which version of information field is held. A host driver of the previous version disregards the new field.

(Length of Data)

The length of data indicates a length of valid data recorded in page 0.

(Number [=N] of Extension Functions)

The number of extension functions indicates how many extension functions are supported by the device. The host driver repeatedly checks, during startup, whether a driver for each extension function is installed by the number of functions being supported.

(Device Information Area)

The device information area can record information on an N number of devices (device 1 to device N). Information on each device will be described below.

(Function Identification Code of Device 1)

When the function identification code of device 1 is set, it indicates that the standard driver can be used. When the OS supports the standard driver, the device can be used without the need to install a dedicated driver. When a dedicated driver has been installed, the dedicated driver will be used with higher priority. In a non-standard function, "0" is set. In that case, the function is controlled only by the dedicated driver.

(Manufacturer Identification Information of Device 1, Function Identification Information of Device 1)

The manufacturer identification information of device 1 and the function identification information of device 1 are items of information used to specify a dedicated driver. The host driver checks whether a dedicated driver of device 1 is installed based on these information items. For the sake of easy identification, these information items are represented as an ASCII character string, for example. The function identification information includes the model, the revision, and the like of the device.

(First Address of Subsequent Device)

The first address of the subsequent device indicates an address in page 0, where information on the subsequent device is written. When the device is not supported by the host system and cannot be used, the subsequent device will be checked. The fields following thereafter are variable in length and hence defined at this position.

(Address Pointers 1-X and Length Fields 1-X of Device 1)

The address pointers 1-X of device 1 and the length fields 1-X indicate that a plurality of extension register areas can be defined in one function. Each of the addresses and the lengths will be listed below.

(Address Pointer 1 [Start Address] and Length 1 of Device 1)

The address pointer 1 (start address) of device 1 and the length 1 indicate a first address in the space of pages 1-7 of the extension register and the size of the extension register area to be used, regarding a first area of the extension register used by device 1.

That is, one or more extension register areas can be allocated to one device, and the address pointer indicates a location (start address) of an arbitrary extension area of pages other than page 0. The length indicates how much the extension register is occupied from the pointer as a first address.

(Address Pointer 2 [Start Address] and Length 2 of Device 1)

The address pointer 2 (start address) of device 1 and the length 2 indicate the location of a second area in the extension register assigned to device 1 and the size of the area. This makes it possible to apply to a case where the standard driver performs control only on the first area and a dedicated driver performs control effectively using the first area and the second area, for example.

(Address Pointer X [Start Address] and Length X of Device 1)

The address pointer X of device 1 (start address) and the length 1 indicate the location of the Xth area assigned to device 1 and the size of the area.

In this way, a plurality of areas can be defined in an extension register. The areas are arranged so as not to overlap with one another. Based on the length information, it is possible to check whether there are overlapping areas.

If an additional field becomes necessary, it will be defined additionally thereafter. A host that cannot recognize the new field reads only fields that can be recognized and disregards the additional field. A skip can be made by the above-described field (i.e., first address of the subsequent device).

Figure 11:
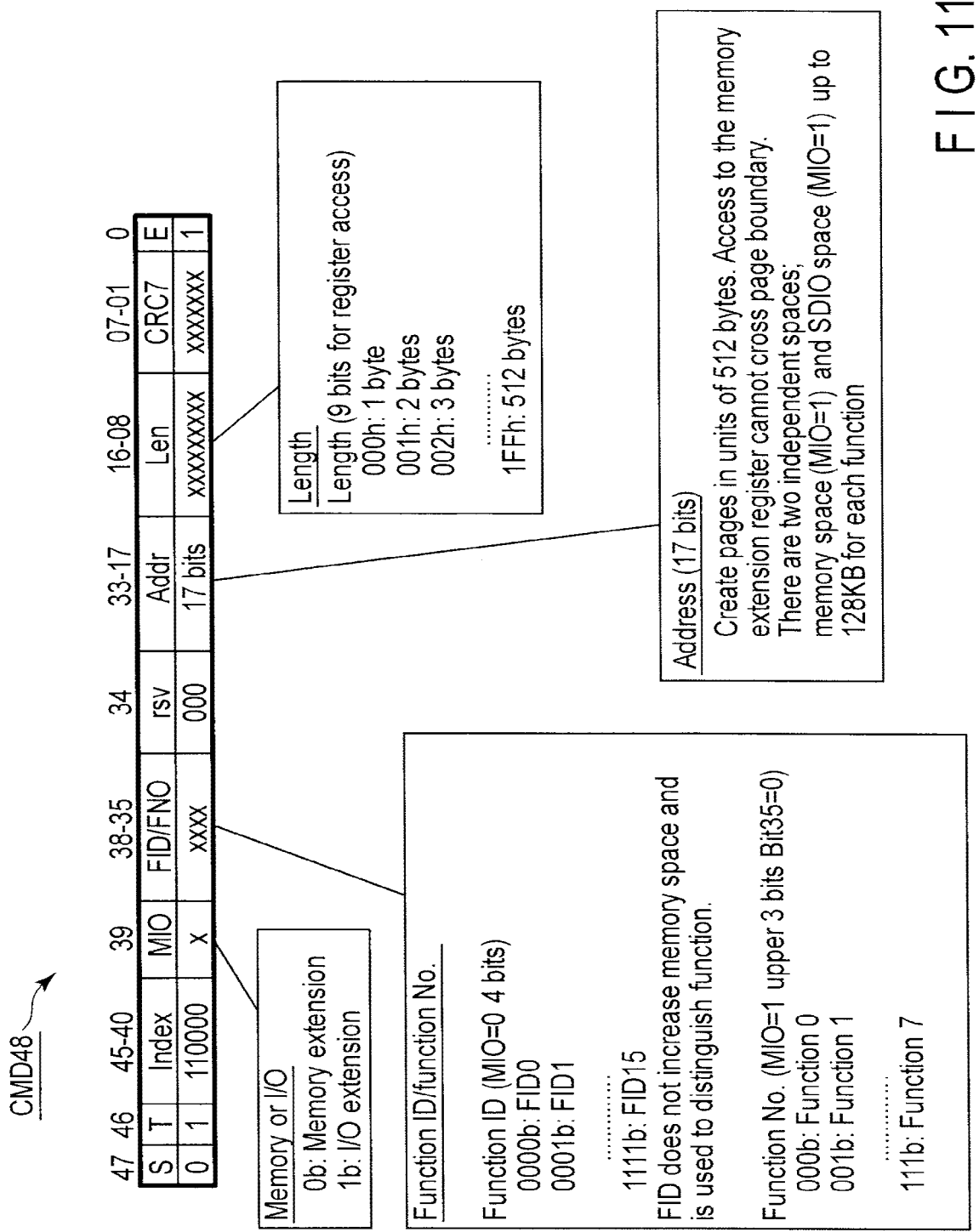
FIG. 11 is a block diagram illustrating another example of a read command on an extension register.
Figure 12:
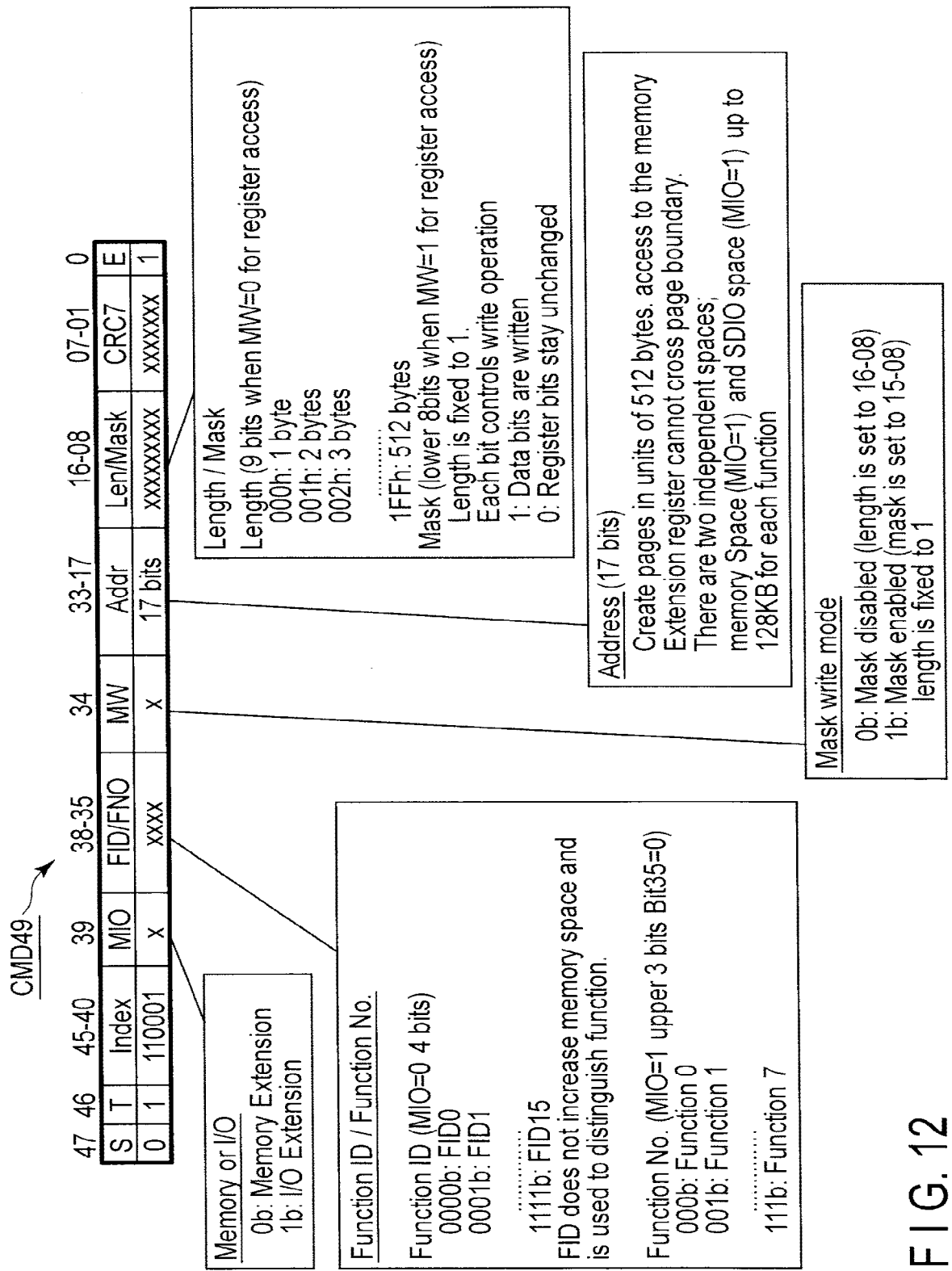
FIG. 12 is a block diagram illustrating another example of a write command to the extension register.

FIG. 11 and FIG. 12 each show another example of the field configuration of a read command CMD 48, and write command CMD 49. It should be noted that in FIG. 11, and FIG. 12, parts identical to FIG. 3, and FIG. 6 are denoted by identical reference symbols, and a description of them is omitted.

The commands CMD 48 and CMD 49 shown in FIG. 11 and FIG. 12 are the commands CMD 48 and CMD 49 shown in FIG. 3 and FIG. 6 in each of which the address field constituted of 12 bits of "RS" and "OFS" is extended to 20 bits constituted of "FNO" and "Addr" to thereby consider the affinity/compatibility to/with the SDIO.

The "MIO" field is a bit separating the memory space and SDIO space from each other, thereby enabling both the spaces to define an extension register independently of each other. Accordingly, when the extension register is defined, it is possible to prevent both the spaces from interfering with each other. When "MIO" is 0 ("MIO"=0), the extension register for the memory can be accessed and, when "MIO" is 1 ("MIO"=1), extension register for the SDIO can be accessed.

The "FNO/FID" field is set to one of "FNO" and "FID" according to the value of the "MIO" field. When "MIO" is 1 ("MIO"=1), "FNO" is a 3-bit field indicating a function number and, when "MIO" is 0 ("MIO"=0), "FID" is a 4-bit field indicating function identification information. Due to the different bit numbers, different symbols are used for expression. When the aforementioned general information field is to be read, "FNO/FID" is set to 0 ("FNO/FID"=0). It is sufficient if the host driver sets this field to 0. Although "FID" is not used in the memory space, "FNO" is used in the SDIO space to distinguish the eight function spaces.

That is, regarding "FNO/FID" (4 bits), when "MIO" is 1 ("MIO"=1), the bits 38 to 36 indicate "FNO", and bit 35 is always made "0".

Further, regarding "FNO/FID", when "MIO" is 0 ("MIO"=0), the bits 38 to 36 indicate "FID". "FID" is used to distinguish the functions without increasing the memory space.

(The memory space may be increased by using "FID", this being not limited.)

When a function is to be implemented in a card, a unique value is assigned to "FID/FNO", and is indicated in the field definition of general information as will be described later. Accordingly, when a command is issued to the data port, the function driver sets "FID/FNO" as an argument, whereby it is possible for the card to confirm that the command is a command corresponding to the designated function. Accordingly, it is possible to prevent data corruption and malfunction due to designation of a wrong data port, and erroneous write from occurring, thereby assuring safety.

Although when the host attempts to specify a function from address information, the host must decode the address information, function distinction is enabled by using only "FID/FNO", and control of the host driver can be simplified. That is, the same command is used by a plurality of functions in a mixing manner, and hence in the host and card, "FID/FNO" is set so that the functions can be distinguished.

The "Addr" field (17 bits) is an address, and can access a space of 128 KB. The upper 8 bits of "Addr" are used as a page number. One of pages 0 to 7 is selected by the 8 bits. A 512-byte block in the selected page is accessed by the lower 9 bits. That is, by using "MIO", "FNO" ("MIO"=1), and "Addr", a position of the extension register is designated.

The "Len" field (8 bits) shown in FIG. 11 indicates an effective data length.

Further, in the write command (CMD 49) shown in FIG. 12, "MW" is a bit used to designate the mask write mode. When "MW" is 0 ("MW"=0), the mask is disabled and, when "MW" is 1 ("MW"=1), the mask is enabled.

Further, in the "Len/Mask" field, when the mask is disabled ("MW"=0), the data length is set to 9 bits (16 to 08). Further, when the mask is enabled ("MW"=1), the data length is set to 1, and the write operation is controlled as described above by the lower 8 bits of the 9 bits (16 to 08). That is, when each bit in the 8 bits is "1", data of the register is written and, when each bit is "0", the bit in the register is not changed, and the value set already is maintained.

(Wireless LAN Compatible SD Card)

Figure 13:
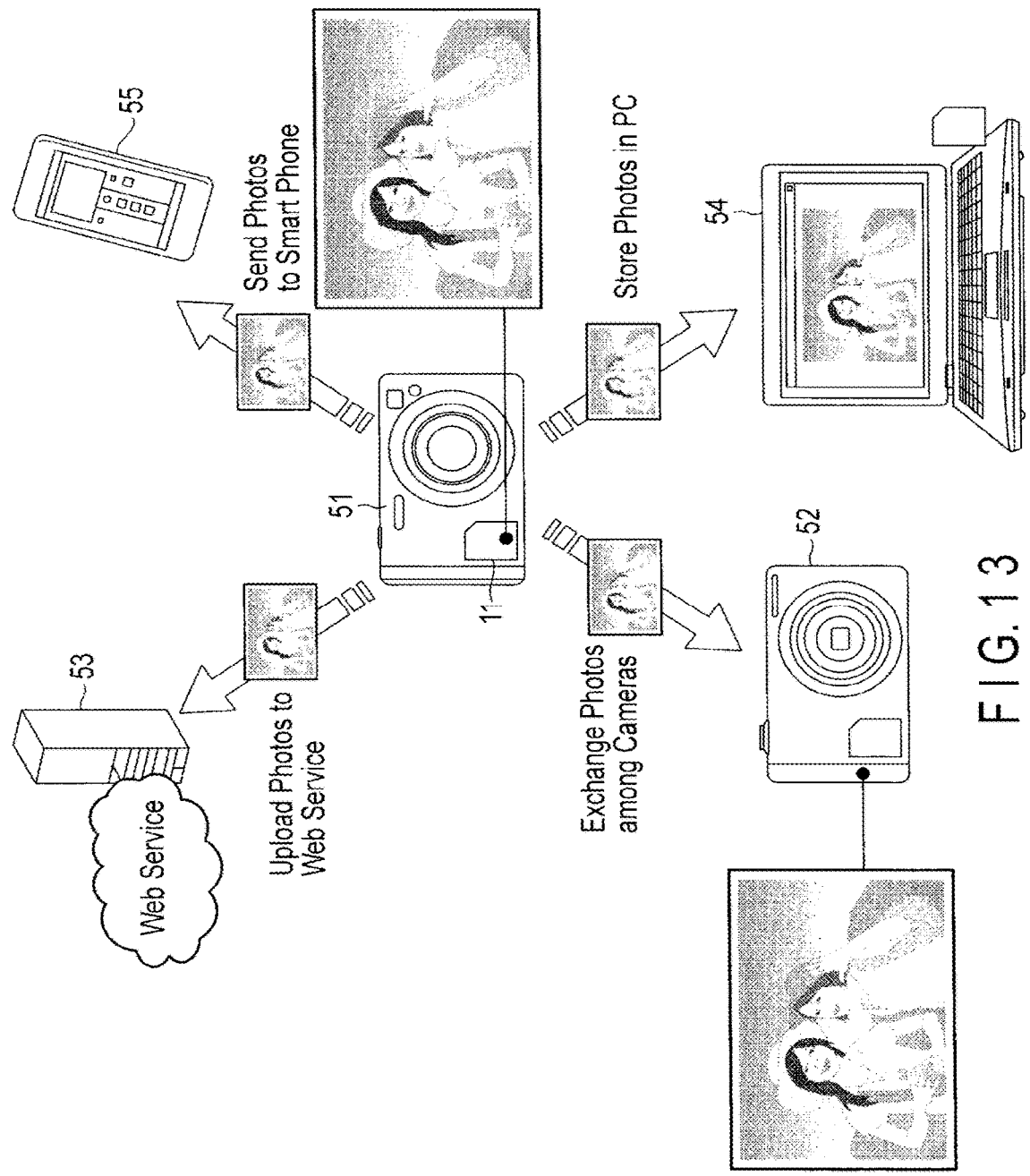
FIG. 13 is a block diagram illustrating a usage example of an SD card including a wireless local area network (LAN).

FIG. 13 shows a usage example of the memory device (SD card) 11 equipped with a wireless communication function. The memory device 11 is attached to digital cameras 51, 52, for example, as a host, a server 53, a personal computer 54, or a cellular phone 55.

The memory device 11 equipped with a wireless communication function is capable of transmitting and receiving picture data to and from another camera 52 via a wireless communication network, by being used with the digital camera 51. Further, the memory device 11 is capable of transferring picture data from the digital camera 51 to the server 53, by being connected to an external server 53, for example, via a wireless communication network. Moreover, the memory device 11 can be connected to a device, such as the personal computer 54 or the cellular phone 55, for example, via a wireless communication network, and transfer picture data thereto from the digital camera 51.

Figure 14:
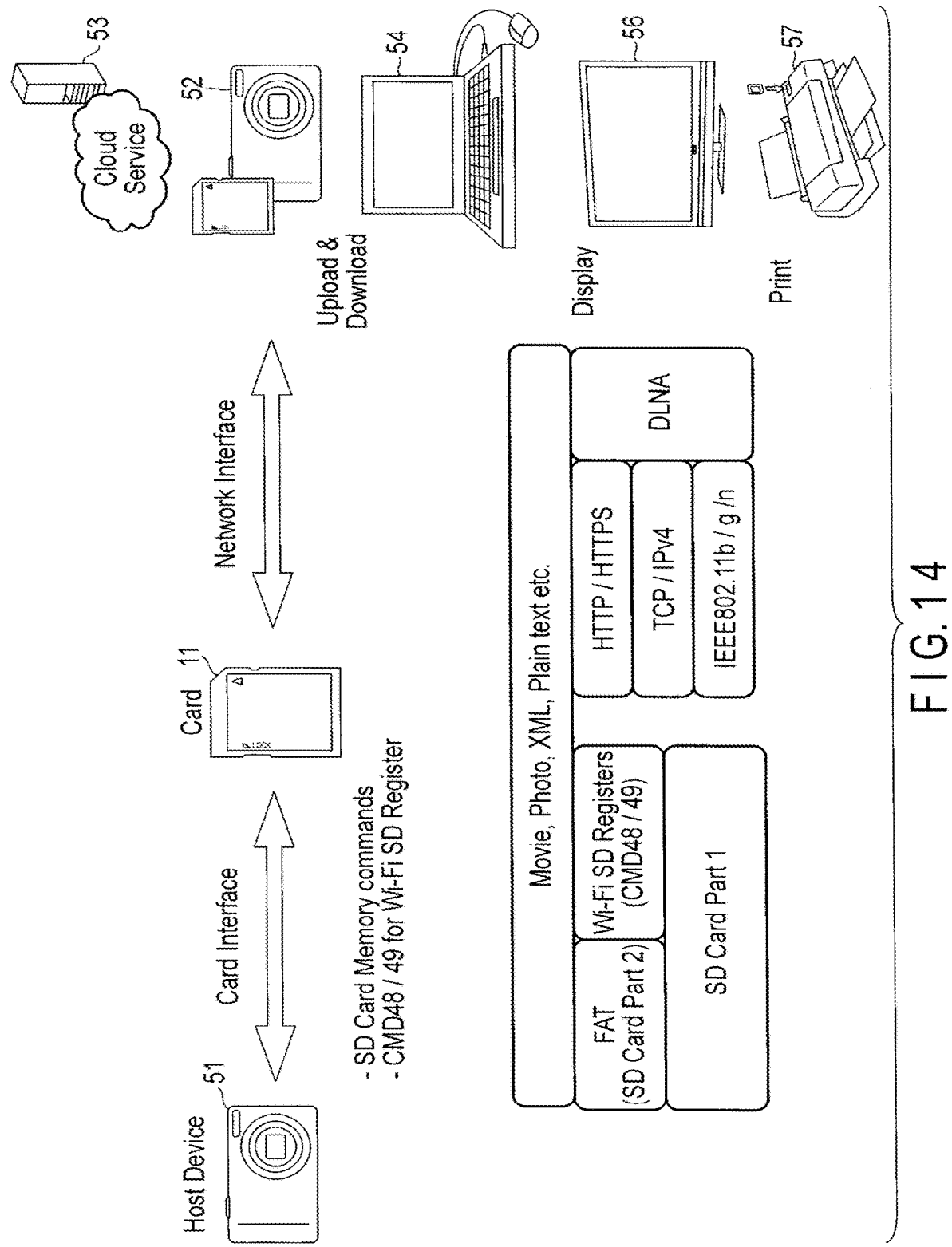
FIG. 14 illustrates an interface function provided in the memory device.

FIG. 14 shows an interface function of the memory device 11.

The memory device 11 equipped with a wireless communication function includes an interface function of serving as an interface between the memory device 11 and the digital camera 51, for example, which serves as a host device configured to control the memory device 11, and a network interface function of connecting the digital camera 51 with other electronic devices, such as the camera 52, the server 53, the personal computer 54, the television 56, and the printer 57, via a wireless LAN.

The above-described host interface (card interface) 12 has a function of accessing data in (reading and writing data from and to) the card via a FAT 32, and a function of accessing a register (Wi-Fi SD register, for example) dedicated to a card having a wireless communication function, according to "SD Specifications Part 1" and "SD Specifications Part 2", established by SD Association (SDA). In order to access a Wi-Fi SD register, a read command (CMD48) and a write command (CMD49) are used. As described above, the read command (CMD48) is a command to read data from a target register on a block-by-block basis, and the write command (CMD49) is a command to write data to a target register on a block-by-block basis.

In the present embodiment, the host 20 issues a command dedicated to a Wi-Fi SD card to the memory device 11, for example. Alternatively, the host 20 receives a status and a response dedicated to a Wi-Fi SD card from the memory device 11 using a write command (CMD49), in order to write data dedicated to a Wi-Fi SD card. Alternatively, a read command (CMD48) is used so as to read data dedicated to a Wi-Fi SD card.

The wireless communication interface 17a is assumed such that the physical layer supports IEEE802.11b/g/n, the network layer supports IPv4 or IPv6, the transport layer supports TCP, the presentation layer supports SSL/TLS, and the application layer supports HTTP or FTP. Further, a Digital Living Network Alliance (DLNA) function may be provided so as to perform communications with household appliances.

By providing two interfaces in the memory device 11, picture data (in JPEG or RAW format) and video data (in MPEG-2 TS or MP4 format) generated by a digital camera can be transmitted or received to or from a server or a device that supports the HTTP protocol. A server or a device that supports the DLNA enables playback the picture or the video and printing of the picture. By adding data (such as XML data and text data) generated by the host device when picture data and video data are transmitted, it becomes possible for the host device to perform an authentication operation on the server and peripheral devices and transmit and receive metadata thereto and therefrom.

FIG. 15 shows a configuration example of the Wi-Fi SD card and the host device.

As described above, the host device 20 includes a host controller 21 configured to control the SD card 11, and is able to issue a command of "SD Specifications Part 1" established by SDA, and commands CMD48 and CMD49 for performing control dedicated to a Wi-Fi SD card.

The SD card 11 includes a card controller 11a, a NAND memory module (NAND flash memory) 18, and a Wi-Fi network module (wireless communication signal processor 19b), and operates according to a command issued from the host controller 21. In a general SD card, the card controller 11a is capable of accessing the NAND memory module 18, and reading and writing data therefrom and thereto. A Wi-Fi SD card of the present embodiment accesses (reads and writes data from and to) the NAND memory module 18, accesses the Wi-Fi network module 19c, and internally transfers data recorded in the NAND memory module 18 to the Wi-Fi network module 19c. Alternatively, the Wi-Fi SD card may be configured to internally transfer data in the Wi-Fi network module 19c to the NAND memory module 18. It is thereby possible for the Wi-Fi network module 19c to transmit picture data recorded in the NAND memory module 18, for example, to the outside, without intervention of the host device 20. That is, the host device 20 does not need to follow a complex procedure of controlling the Wi-Fi network module 19c.

Further, since picture data is internally transferred without intervention of a card interface, the transfer rate can be increased. For example, by controlling internal transfer of the picture data using a direct memory access (DMA) register provided inside the card controller, the host device 20 and the SD card 11 can operate independently.

Further, status information of the Wi-Fi network module 19c and data downloaded from an external network server, for example, can be directly and automatically recorded in the NAND memory module 18, without the need for the host device 20 to sequentially manage them.

FIG. 16 shows another configuration example of the SD card 11 and the host device 20.

In FIG. 16, the SD card 11 is not equipped with a Wi-Fi function, unlike FIG. 15, and comprises a card controller 11b and a NAND memory module 18. The host device 20 has a Wi-Fi function. That is, the host device 20 includes a host controller 21, a Wi-Fi network module 19c, and a card controller 25 configured to separate a read command (CMD48) and a write command (CMD49) from each other.

According to this configuration, when the digital camera has a Wi-Fi function, the Wi-Fi network module 19c can be controlled by the control method same as that of FIG. 15.

FIG. 17 shows an example of an extension register accessed via a read command (CMD48) and a write command (CMD49). As described above, page 0 of the extension register is an index of page 1 and subsequent pages. By reading page 0, the host device 20 is able to ascertain information such as what function is provided in the card, version information and profile information of the standard of the supported function (which of the optional functions is supported), and driver information for controlling the function (from which manufacturer the driver is provided, and of which version the driver is), and the like. For example, if a card has a Bluetooth (registered trademark) function as well as a Wi-Fi function, a register designed to access the Wi-Fi function is assigned to page 1, and a register designed to access the Bluetooth function is assigned to page 2, for example. The host device 20 is capable of accessing pages 1 and 2, as necessary, and using the both functions simultaneously. This enables an operation of downloading data from an external server using the Wi-Fi function, temporarily recording the downloaded data in the card, transferring the temporarily recorded data to a peripheral device using a Bluetooth function for playback and display, for example.

Figure 18:
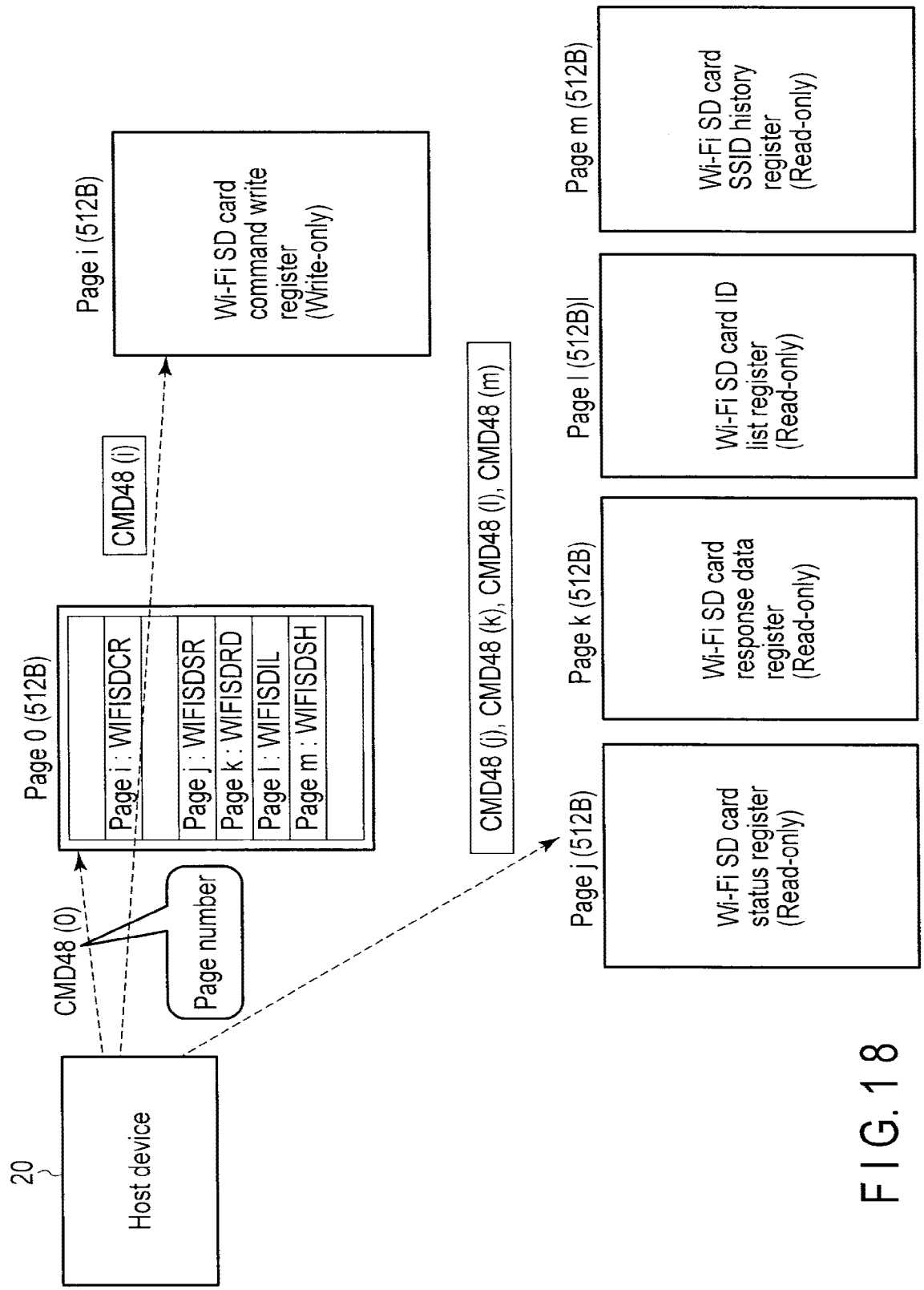
FIG. 18 shows an example of the case where the extension register is used as a Wi-Fi SD card.

FIG. 18 shows a case where the extension register is used in a Wi-Fi SD card.

The Wi-Fi SD card includes 5 types of extension registers, provided according to the purpose. A Wi-Fi SD card command write register is a write-only register and is accessed when a command is issued from the host device to the card. A Wi-Fi SD card status register is a read-only register and is accessed when the host device retrieves status information on the card. A Wi-Fi SD card response data register is a read-only register and is accessed when the host device retrieves data (HTTP response data) downloaded from an external server into the card. A Wi-Fi SD card ID list register is a read-only register and is accessed when the host devices retrieves a list of IDs of other devices connected to the card (or requesting connection thereto). A Wi-Fi SD card SSID history register is a read-only register and is accessed when the host device retrieves a list of SSIDs to which the card has previously been connected (or to which connection has not been made but a connection request has been made). In the present embodiment, a case will be described where the above-described Wi-Fi SD registers are assigned to pages of the extension registers. First, the host device 20 reads page 0 of the extension register using a read command (CMD48), and checks whether the Wi-Fi SD function is implemented on the card and which page should be accessed so as to use each function. In this case, a pair of a page number (i, j, k, l, m) and an abbreviation (WIFISDCR, WIFISDSR, WIFIS-DRD, WIFISDIL, WIFISDSH) of the Wi-Fi SD register is recorded in page 0.

When the host device 20 issues a command to the card, data is written to the Wi-Fi SD card command write register, which is a register designed to issue a command, via a write command (CMD49). In this case, since it is known from the information in page 0 that the Wi-Fi SD card command write register is in page i, page 1 is specified as an argument of CMD49. Similarly, when the host device 20 retrieves status information, for example, from the host device 20, data is read using a read command (CMD48) from one of the Wi-Fi SD card status register, the Wi-Fi SD card response data register, the Wi-Fi SD Card ID list register, and the Wi-Fi SD card SSID history register, each of which is a register designed to obtain data. In this case, the page numbers j, k, l, m, corresponding to the respective registers, are specified as arguments of CMD48.

In the present embodiment, the write register and the read register are assigned to different pages, but are designed only for writing and reading, respectively, and hence may be allocated to the same page.

Figure 19:
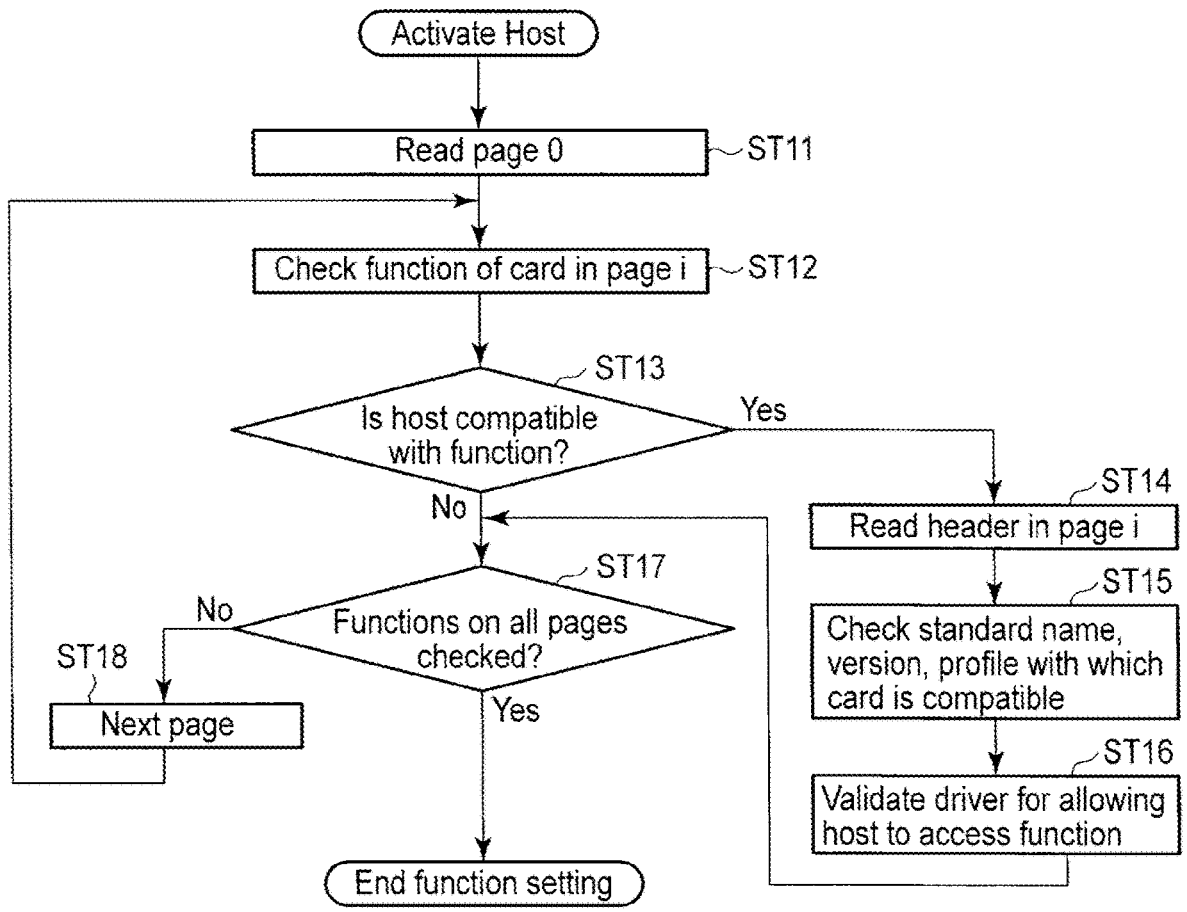
FIG. 19 is a flowchart showing an operation during startup of the host device.

FIG. 19 shows an operation of the host device 20 during startup.

The host device 20 issues a read command (CMD48) upon startup, reads data in page 0 of the extension register 31, and checks the wireless communication function as an extension function of the SD card 11 (ST11, ST12). That is, the host device 20 checks what wireless communication function, such as Wi-Fi or Bluetooth, is implemented on the SD card 11. Next, the host device 20 determines whether the host device 20 is compatible with the extension function of the SD card 11 (ST13). When the host device 20 is determined as being compatible with the extension function, in order to validate the extension function, data in page i (where i is other than 0) of the extension register 31 is read (ST14), and the standard name, version, profile, device information, and the like with which the SD card is compatible are checked (ST15). Based on the checked information, the host device 20 validates an optimum driver included in the host device 20 (ST16). Thereby, the extension function of the SD card 11 is made accessible.

Next, it is determined whether functions of all the pages of the extension register 31 have been checked (ST17). As a result thereof, when a remaining page exists, functions of the card on the next page are checked (ST18, ST16), and when all the pages have been checked, the function setting is ended.

(Wireless LAN Setting)

Figure 20:
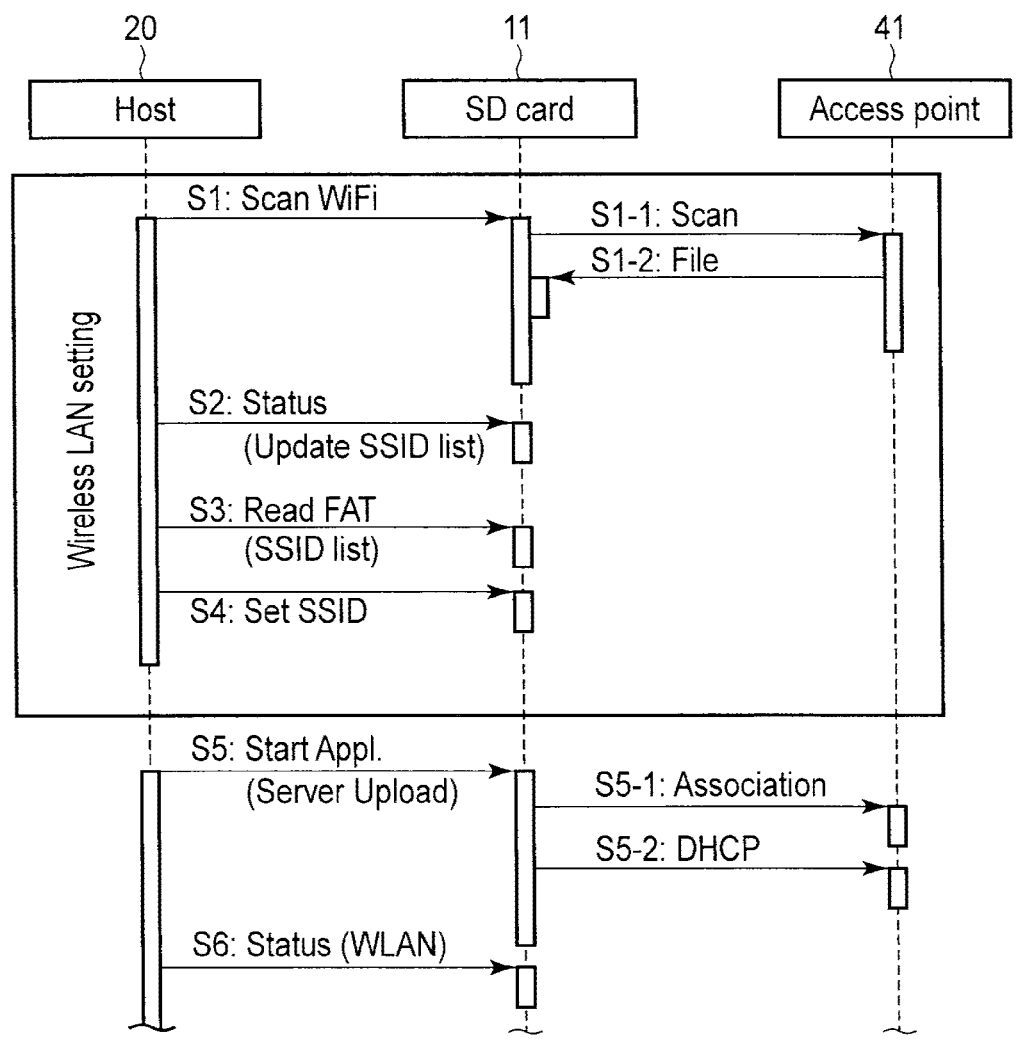
FIG. 20 illustrates an operation of setting a wireless LAN.

FIG. 20 shows an operation of setting a wireless LAN. In FIG. 20, in order to search a Wi-Fi network, the host 20 issues a command (CMD49) to the SD card 11 (S1). Data of the command (CMD49) includes a "ScanWiFi" command configured to search a Wi-Fi network. The "ScanWiFi" command is written to page i, for example, of the extension register 31. In response to the "ScanWiFi" command, the CPU 13 of the SD card 11 activates the wireless LAN signal processor 19a via the wireless communication interface 17a, and the wireless LAN signal processor 19a scans an access point of the network (S1-1). The scanned result is stored in the NAND flash memory 18 as "SSIDLIST" file via the wireless communication interface 17a, the buffer 16, and the memory interface 17b (S1-2). The "SSIDLIST" file includes a name (SSID) of an accessible access point. When "SSI-DLIST" of the NAND flash memory 18 is updated, the status of the Wi-Fi SD card status register provided in page j of the extension register 31 is updated.

During this period, the host 20 determines whether the status of the NAND flash memory 18 has been updated based on polling (S2). More specifically, the host 20 reads the status of the Wi-Fi SD card status register via a command (CMD48), and checks whether the SD card 11 has succeeded in scanning the SSID.

When the SD card 11 has succeeded in scanning the SSID, the host 20 reads the "SSIDLIST" file stored in the NAND flash memory 18, using a usual read command (S3).

After that, the host 20 selects one of the SSIDs from the "SSIDLIST" file and issues a command (CMD49). That is, the command (CMD49) writes a "SetSSID" command to page i of the extension register 31. In response thereto, the host 20 requests the SD card 11 to set the SSID (S4).

After that, the host 20 writes "StartApplication" command to page i of the extension register 31 via the command (CMD49). Thereby, the host 20 requests the SD card 11 to start operating a wireless LAN application (S5).

In response to the "StartApplication" command, the SD card 11 requests an access point to establish an association via the wireless LAN signal processor 19a (S5-1), in order to establish a communication with a network. When a response for the association is received from the access point, the SD card 11 acquires an IP address from the access point based on Dynamic Host Configuration Protocol (DHCP), and prepares for establishing a communication (S5-2). When preparation for establishing a communication has been completed, the status of the Wi-Fi SD card status register provided in page j of the extension register 31 is updated.

During this period, the host 20 determines whether the status has been updated based on polling (S6). More specifically, the host 20 reads the status of the Wi-Fi SD card status register via a command (CMD48), and determines whether the status has been updated. When the status has been updated, a communication is started between the SD card 11 and the access point, allowing the SD card 11 to obtain data from the network without intervention of the host 20, for example.

(HTTP Transmission)

Next, a case will be described where HTTP communications are performed using commands (CMD48, CMD49).

In the present embodiment, "SendHttpMessage", "SendHttpFile", "SendHttpMessageByRegister", and "SendHttpFileByRegister", for example, are prepared as server upload commands. These commands are registered in the Wi-Fi SD card command write register provided in page i of the extension register 31, via the command (CMD49). The commands "SendHttpMessage" and "SendHttpFile" are used in HTTP communications of data greater in size than 512 bytes, for example, using a FAT file system. The commands "SendHttpMessageByRegister" and "SendHttpFileByRegister" are used in HTTP communications of data smaller in size than 512 bytes, for example, without using a FAT file system.

As described above, the extension register 31 can be accessed in a block of 512 bytes long, via the commands (CMD48, CMD49). On the other hand, a multi-block access can be made to a file system of a usual SD card 11, using a read command (CMD18) and a write command (CMD25). Hence, in a high-capacity HTTP communication, data should desirably be transferred to the SD card 11 using an access command of the SD card 11 for efficient operation.

That is, when a file is transferred to a server, for example, the size of an HTTP request increases. Further, metadata, or data about data, appended to a transfer file greatly depends upon the function or request of the host device. Accordingly, the format of the HTTP request should desirably be flexible toward the host. In view of the above, in the present embodiment, information on the HTTP request is set by the host, and an HTTP protocol process is performed by an SD card, thereby eliminating the load on the host device.

A low-capacity HTTP communication, on the other hand, should desirably be performed easily and at high speed, by using only a command (CMD49).

The formats of the transmission commands are listed below.

SendHttpMessage (hostname, messageFileName)
SendHttpFile (hostname, messageFileName, appendFileName) SendHttpMessageByRegister (hostname, message)
SendHttpFileByRegister (hostname, appendFileName, message)

Hereinafter, the operation of each of the commands will be described.

(Operation of Command "SendHttpMessage")

Figure 21:
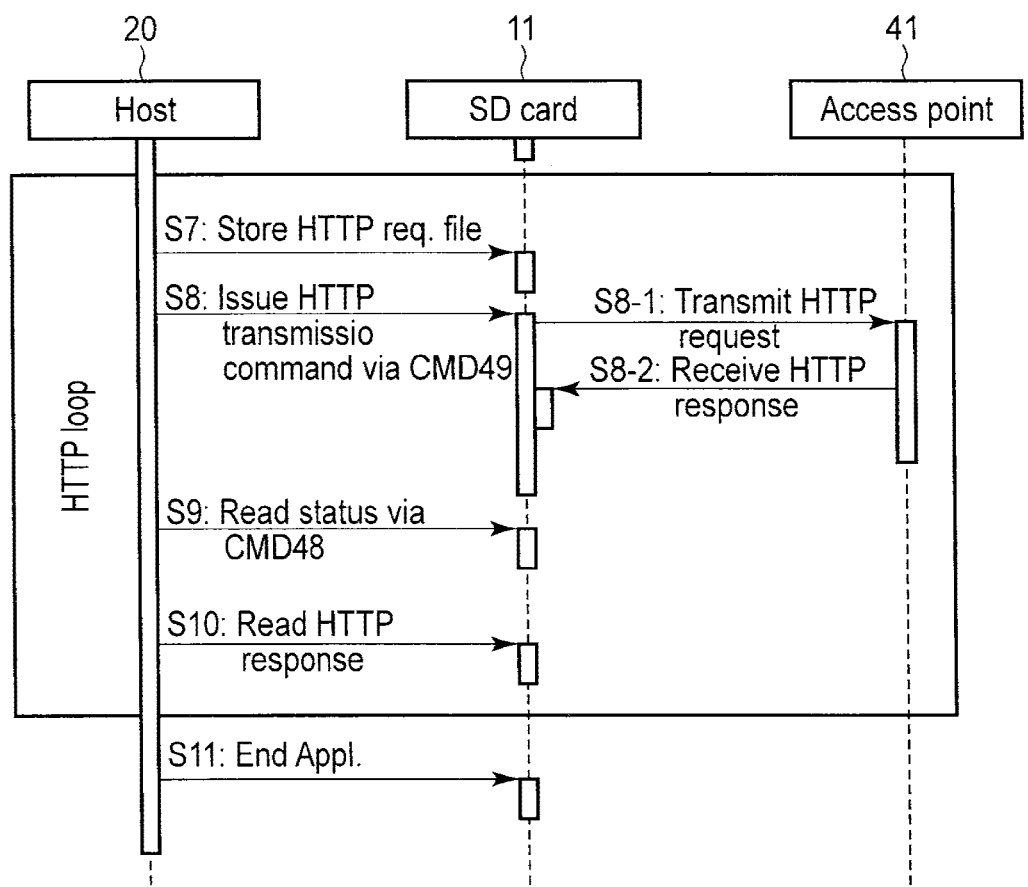
FIG. 21 illustrates an example of an operation of a Hypertext Transfer Protocol (HTTP) communication.

FIG. 21 shows an operation of the command "SendHttpMessage". The command "SendHttpMessage" is used when high-capacity HTTP data is transmitted and received via a network. The command "SendHttpMessage" includes, as arguments, the host name "hostname" and the file name "messageFileName" of the file storing a message of the HTTP request.

As shown in steps S5, S6 of FIG. 20, in order to establish an HTTP communication after a wireless communication is started, the host 20 issues a write command (CMD25) to the SD card 11, and transmits an HTTP request file to the SD card 11. In response to the write command (CMD25), the CPU 13 of the SD card 11 writes an HTTP request file to the NAND flash memory 18 (S7).

Next, the host 20 issues a command (CMD49) and transmits the command "SendHttpMessage" to the SD card 11. Based on the command (CMD49), the CPU 13 of the SD card 11 registers the command "SendHttpMessage" in the Wi-Fi SD card command write register provided in page i of the extension register 31 (S8).

After that, the CPU 13 of the SD card 11 reads the HTTP request file written to the NAND flash memory 18 based on the command "SendHttpMessage" registered in the extension register, and transmits the HTTP request file to the network via the wireless LAN signal processor 19*a* (S8-1).

After that, when the CPU 13 of the SD card 11 receives an HTTP response via the wireless LAN signal processor 19*a*, the CPU 13 stores the received HTTP response as a file in the NAND flash memory 18 (S8-2).

The received response file is stored in a predetermined download directory of the NAND flash memory 18. A sequence number specified by a command issued from the command (CMD49), for example, is assigned to the name of the stored file.

When the CPU 13 receives an HTTP response, the CPU 13 updates the status of the Wi-Fi SD card status register provided in page j of the extension register 31.

On the other hand, the host 20 determines whether the status of the Wi-Fi SD card status register has been updated based on polling. That is, the host 20 issues a command (CMD48), reads the status of the Wi-Fi SD card status register, and determines whether the status has been updated (S9).

When the status of the Wi-Fi SD card status register is determined as having been updated, the host 20 issues a read command (CMD18) of the SD card 11. The CPU 13 of the SD card 11 reads an HTTP response file from the NAND flash memory 18 based on the read command (CMD18), and transfers the HTTP response file to the host 20 (S10).

When the HTTP response file is transferred to the host 20, the host 20 issues an end application, thereby ending the operation of the application (S11).

By using the above-described transmission command, a high-capacity HTTP file can be efficiently transferred to a server.

According to the present embodiment, an HTTP request and an HTTP response can be transmitted and received by using a FAT area of the NAND flash memory 18, rather than causing the extension register 31 to perform the entire HTTP communication.

(Operation of Command "SendHttpFile")

Figure 22:
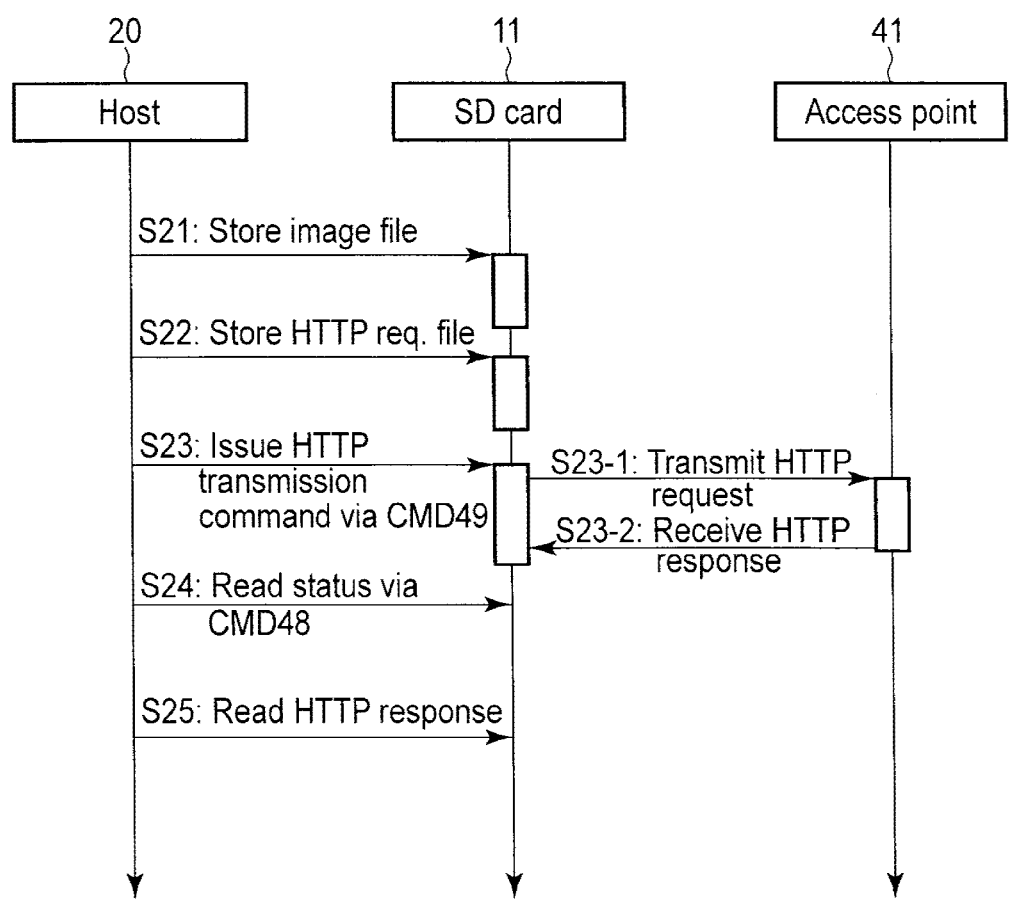
FIG. 22 illustrates another example of an operation of an HTTP communication.

FIG. 22 shows an operation of the command "SendHttpFile". The command "SendHttpFile" is used when an image file in the SD card 11 is transmitted to a network, for example. The command "SendHttpFile" includes, as arguments, a host name "hostname", a message file name "messageFileName", and an append file name "appendFilename" indicating the name of the image file, for example, in the SD card 11.

In this example, as shown in FIG. 22, the host 20 issues a write command (CMD25), and then transfers an image file to be transferred to the network to the SD card 11 (S21). The CPU 13 of the SD card 11 writes an image file to the NAND flash memory 18 based on the write command (CMD25).

After that, the host 20 issues a write command (CMD25), and transfers an HTTP request file to the SD card 11 (S22). The HTTP request includes uploading an image file in the NAND flash memory 18 to a server, for example, and defines the name and time information, for example, of the image file in the NAND flash memory 18 as metadata. The SD card 11 writes an HTTP request to the NAND flash memory 18 based on the write command (CMD25).

After that, the host 20 issues a command (CMD49), and transfers a HTTP communication command "SendHttpFile" to the SD card 11 (S23). The CPU 13 of the SD card 11 registers the command "SendHttpFile" in the Wi-Fi SD card command write register provided in page i of the extension register 21, based on the command (CMD49).

Further, the CPU 13 of the SD card 11 reads the HTTP request file written to the NAND flash memory 18 based on the command "SendHttpFile" registered in the extension register, and transmits a character string predefined in the HTTP request file from the wireless LAN signal processor 19a to a network by replacing the character string with information on the image file read from the NAND flash memory 18 (S23-1).

After that, when the CPU 13 of the SD card 11 receives an HTTP response via the wireless LAN signal processor 19a, the CPU 13 stores the HTTP response as a file in the NAND flash memory 18 (S23-2).

When the CPU 13 of the SD card 11 receives the HTTP response, the CPU 13 updates the status of the Wi-Fi SD card status register provided in page j of the extension register 31.

In the meantime, the host 20 determines whether the status of the Wi-Fi SD card status register has been updated based on polling. That is, the host 20 issues a command (CMD48), reads the status of the Wi-Fi SD card status register, and determines whether the status has been updated (S24). When the status of the Wi-Fi SD card status register is determined as having been updated, the host 20 issues a read command (CMD18) of the SD card 11.

The CPU 13 of the SD card 11 reads the HTTP response file from the NAND flash memory 18 based on the read command (CMD18), and transfers the HTTP response file to the host 20 (S25).

Using the above-described transmission command, the image file in the SD card 11 can be efficiently transferred to the server.

(Execution of Command "SendHttpMessageByRegister")

Figure 23:
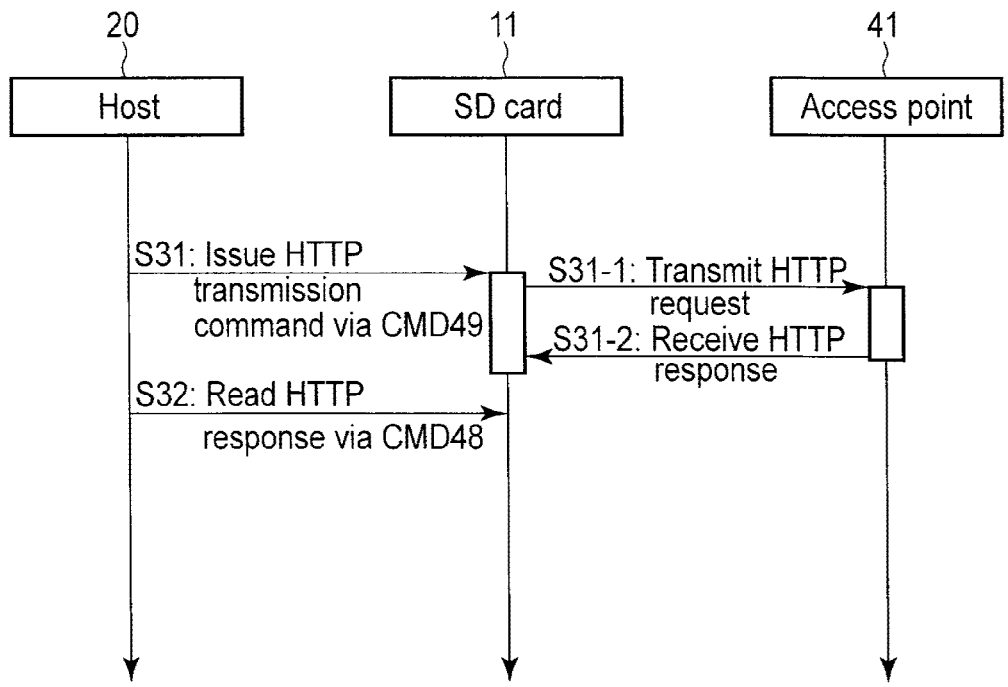
FIG. 23 illustrates another example of an operation of an HTTP communication.

FIG. 23 shows an operation of the command "SendHttpMessageByRegister".

The command "SendHttpMessageByRegister" is used when the data of an HTTP communication is small in size. In the commands "SendHttpMessage" and "SendHttpFile" configured to handle high-capacity HTTP communications, an HTTP request file is recorded in the NAND flash memory 18 via a write command (CMD25), and the command "SendHttpMessage" or "SendHttpFile" is registered in the extension register via a command (CMD49). On the other hand, the command "SendHttpMessageByRegister" is configured to be executed only via a command (CMD49).

The command "SendHttpMessageByRegister" includes "hostname" and "message" as arguments. An HTTP request (HTTP header information) is included in "message" as a character string.

As shown in FIG. 23, in order to establish an HTTP communication, the host 20 issues a command (CMD49) (S31). The command "SendHttpMessageByRegister" is written on data on the command (CMD49).

Based on the command (CMD49), the CPU 13 of the SD card 11 registers the command "SendHttpMessageByRegister" in the Wi-Fi SD card command write register provided in page i of the extension register 31.

Based on the command "SendHttpMessageByRegister" registered in the extension register, the CPU 13 of the SD card 11 transmits an HTTP request from the wireless LAN signal processor 19a to a network (S31-1).

After that, when the CPU 13 of the SD card 11 receives an HTTP response via the wireless LAN signal processor 19a, the CPU 13 stores the HTTP response in the Wi-Fi SD card response register provided in page k of the extension register 31 (S31-2).

On the other hand, the host 20 issues a command (CMD48), reads an HTTP response from the Wi-Fi SD card response register, and stores the HTTP response as a file (S32).

Using the above-described transmission command, a low-capacity HTTP communication can be efficiently performed.

(Operation of Command "SendHttpFileByRegister")

Figure 24:
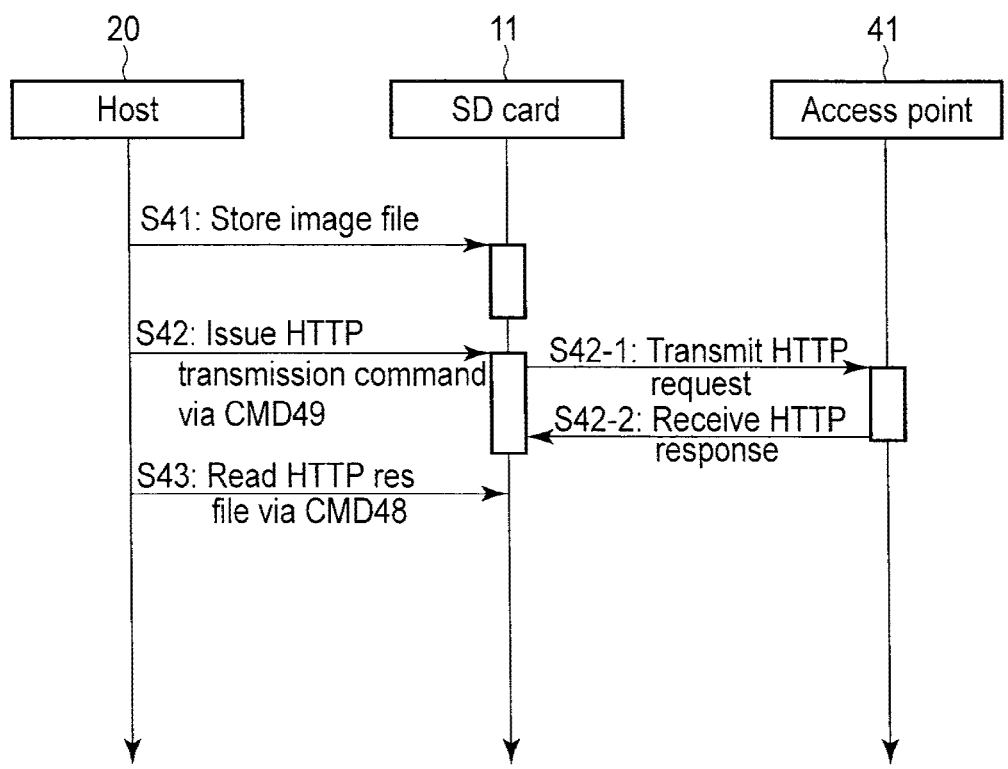
FIG. 24 illustrates another example of an operation of an HTTP communication.

FIG. 24 shows an operation of the command "SendHttpFileByRegister".

The command "SendHttpFileByRegister" is also used when data of an HTTP request other than the data file transmitted via the HTTP communication is small in size. The request is to upload a file stored in the SD card 11 to a server, for example. Since the transmission format to the server cannot be transmitted only as a file, however, header information or metadata of the HTTP request needs to be appended. Hence, a predefined character string is defined in the HTTP request message. In response to a transmission request transmitted from the host 20, the SD card 11 transmits the predefined character string of the HTTP request message by replacing the character string with information on a specified file.

The command "SendHttpFileByRegister" includes a host name "hostname", an append file name "appendFileName", and a message "message" as arguments. The name of the image file in the NAND flash memory 18 is written in "appendFileName", and an HTTP request (HTTP header information) is written in "message" as a character string.

As shown in FIG. 24, the host 20 issues a write command (CMD25), and then transfers an image file to be transferred to a network to the SD card 11 (S41), for example. The CPU 13 of the SD card 11 writes an image file to the NAND flash memory 18 based on the write command (CMD25).

After that, the host 20 issues a command (CMD49) (S42). The command "SendHttpFileByRegister" is written on the data of the command (CMD49).

Based on the command (CMD49), the CPU 13 of the SD card 11 registers the command "SendHttoFileByRegister" in the Wi-Fi SD card command write register provided in page i of the extension register.

Further, the CPU 13 of the SD card 11 reads a file read from the NAND flash memory 18 based on the append file name of the command "SendHttpFileByRegister" registered in the extension register, and transmits a character string predefined in the HTTP request message from the wireless LAN signal processor 19a to the network by replacing the character string with the read file (S42-1).

After that, when the CPU 13 of the SD card 11 receives an HTTP response via the wireless LAN signal processor 19a, the CPU 13 stores the HTTP response in the Wi-Fi SD card response register provided in page k of the extension register 31 (S42-2).

In the meantime, the host 20 issues a command (CMD48), reads the HTTP response from the Wi-Fi SD cards response register, and stores or processes the HTTP response as a file (S43).

According to the present embodiment, when a high-capacity HTTP request or image data is transmitted and received, the host 20 sets information on the HTTP request, transfers the data to a NAND flash memory of the SD card 11 using an access command of the SD card 11, and stores "SendHttpMessage" or "SendHttpFile" as high-capacity HTTP communication commands in the extension register 31 using a command (CMD49), whereas the SD card 11 performs HTTP protocol processing. It is thereby possible to eliminate the load on the host 20.

That is, when a file is transmitted to a network, for example, the host 20 sets difference in format among a variety of social network services and photograph sharing websites, according to the HTTP message. Thereby, the SD card 11 is able to transmit an HTTP request and append information simultaneously to a server, without distinctions among the services provided in transmission destinations.

Further, when the host 20 generates HTTP request information, the host 20 does not need to read files of the file system in the SD card 11 and compile the information on the files and append information dependent on a variety of services into a new file of the HTTP request data. That is, by causing the host 20 to generate only append information necessary for the HTTP request, and causing the SD card 11 to set a path of the file stored in the SD card 11 based on the information on the transmission command via the extension register 31, a desired HTTP request can be generated. Thereby, processing of the host 20 and the SD card 11 can be processed more easily.

Further, by storing high-capacity data in the NAND flash memory 18, the SD card 11 has an advantage of reducing the memory capacity necessary for processing.

Moreover, in a low-capacity HTTP communication, the host 20 transmits an HTTP request or transmission commands "SendHttpMessageByRegister" and "SendHttpFileByRegister" to the extension register 31 via only a command (CMD49, CMD8), and the SD card 11 performs HTTP protocol processing. Since disagreement in file system is not caused between the host 20 and the SD card 11, valid data can be exchanged when the transfer data is small in size.

By setting the SD card to be able to automatically delete a header portion of an HTTP response, the host device is able to obtain a desired HTML, XML, a JPEG image, and the like received via the HTTP protocol. Thereby, the host device of the SD card is able to obtain a desired file without the need to perform a general TCP/IP process or the like.

Further, the "SendHttpMessage" command may include a name or an IP address that can be resolved by the Domain Name System (DNS) of an HTTP communication destination server.

Moreover, commands "SendHttpSSLMessage", "SendHttpSSLFile", "SendHttpSSLMessageByRegister", and "SendHttpSSLFileByRegister", which performs an HTTPS access using SSL/TLS as an access protocol to the network, may be used so as to long in to or perform authentication on a sever that makes a security request. The sequence of the host and the SD card in these commands "SendHttpSSLMessage", "SendHttpSSLFile", "SendHttpSSLMessageByRegister" and "SendHttpSSLFileByRegister" is the same as that in the commands "SendHttpMessage", "SendHttpFile", "SendHttpMessageByRegister" and "SendHttpFileByRegister".

Moreover, the extension register is not limited to a plurality of pages, and may be set to 1 page such that the areas corresponding to page 0 and pages 1-7 are set therein.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless communication memory card being connectable to a host apparatus, the wireless communication memory card comprising:
a non-volatile semiconductor memory device;
a card controller circuit configured to control a reading and a writing to the non-volatile semiconductor memory device in response to requests from the host apparatus;
a wireless communication module configured to perform a wireless communication function; and
an extension register including a first data port for the host apparatus to write commands controlling the wireless communication function; wherein:
the wireless communication memory card receives from the host apparatus a first request for writing a first command to the first data port, and scans access points of a network in accordance with the first command written to the first data port; and
the wireless communication memory card informs the host apparatus of the result of the scanning.

2. The wireless communication memory card according to claim 1, wherein:
the extension register is configured to store information concerning an address area of the extension register assigned to the wireless communication function; and
the address area includes the first data port.

3. The wireless communication memory card according to claim 1, wherein:
the wireless communication memory card receives from the host apparatus a second request for writing a second command to the first data port; and
the second command designates a specific access point of the network.

4. The wireless communication memory card according to claim 1, wherein the card controller circuit writes a first operation file and a second operation file to the extension register in accordance with a first write command supplied from the host apparatus.

5. The wireless communication memory card according to claim 1, wherein the card controller circuit writes a status file of the wireless communication module to the extension register, and
the card controller circuit reads the status file from the extension register and outputs the status file to the host apparatus in accordance with a first read command supplied from the host apparatus.

6. The wireless communication memory card according to claim 1, wherein the non-volatile semiconductor memory device, the card controller circuit, the wireless communication module, and the extension register are arranged in an SD card.

7. The wireless communication memory card according to claim 6, wherein a result of the scanning includes an SSID list.

8. The wireless communication memory card according to claim 1, wherein the card controller circuit writes a request to the non-volatile semiconductor memory device in accordance with a third command supplied from the host apparatus.

9. The wireless communication memory card according to claim 8, wherein the request includes an HTTP request.

10. The wireless communication memory card according to claim 9, wherein the card controller circuit stores data to the non-volatile semiconductor memory device and transmits the request and the data with the wireless communication module.

* * * * *